(12) United States Patent
Kim et al.

(10) Patent No.: US 11,768,401 B2
(45) Date of Patent: Sep. 26, 2023

(54) DISPLAY APPARATUS

(71) Applicant: SAMSUNG ELECTRONICS CO., LTD., Suwon-si (KR)

(72) Inventors: Sungyeol Kim, Suwon-si (KR); Kyehoon Lee, Suwon-si (KR); Kyungsoo Park, Suwon-si (KR); Hyukjun Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/827,164

(22) Filed: May 27, 2022

(65) Prior Publication Data
US 2022/0413341 A1 Dec. 29, 2022

Related U.S. Application Data

(63) Continuation of application No. PCT/KR2022/007117, filed on May 18, 2022.

(30) Foreign Application Priority Data

Jun. 29, 2021 (KR) ........................ 10-2021-0084830

(51) Int. Cl.
*G02F 1/13357* (2006.01)

(52) U.S. Cl.
CPC .. *G02F 1/133605* (2013.01); *G02F 1/133603* (2013.01)

(58) Field of Classification Search
CPC ................. G02F 1/133605; G02F 1/133603
See application file for complete search history.

(56) References Cited

U.S. PATENT DOCUMENTS

| 6,940,099 | B2 | 9/2005 | Hata et al. |
| 7,834,952 | B2 | 11/2010 | Lee et al. |
| 8,609,448 | B2 | 12/2013 | Chen et al. |
| 8,860,907 | B2 | 10/2014 | Kasano et al. |

(Continued)

FOREIGN PATENT DOCUMENTS

| JP | 5877347 B2 | 3/2016 |
| KR | 10-2005-0121076 A | 12/2005 |

(Continued)

OTHER PUBLICATIONS

English translation of Park KR-20160076346-A, published Jun. 2016 (Year: 2016).*

(Continued)

*Primary Examiner* — Evan P Dzierzynski
(74) *Attorney, Agent, or Firm* — Sughrue Mion, PLLC

(57) ABSTRACT

A display apparatus includes a liquid crystal panel, a substrate, and a plurality of light emitting diodes (LEDs) provided on one side of the substrate and configured to emit light towards the liquid crystal panel. Each of the plurality of LEDs includes a first reflection layer, a second reflection layer, and a light emitting layer provided between the first reflection layer and the second reflection layer. The second reflection layer is provided between the substrate and the light emitting layer. A first reflectivity of the first reflection layer for a first light entering at a first incident angle is different from a second reflectivity of the second reflection layer for the first light entering at the first incident angle.

20 Claims, 15 Drawing Sheets

(56) References Cited

U.S. PATENT DOCUMENTS

| | | |
|---|---|---|
| 10,401,557 B2 | 3/2019 | Kim et al. |
| 11,387,395 B2 | 7/2022 | Yun et al. |
| 2005/0280756 A1 | 12/2005 | Kim et al. |
| 2007/0159573 A1* | 7/2007 | Lee ................... G02F 1/133606 349/65 |
| 2011/0051397 A1* | 3/2011 | Bae ...................... G02B 6/0021 362/235 |
| 2011/0085352 A1* | 4/2011 | Ito ........................... H01L 33/44 362/617 |
| 2014/0140046 A1* | 5/2014 | Ono .................. G02F 1/133603 362/97.1 |
| 2018/0136520 A1* | 5/2018 | Kim .................. G02F 1/133605 |
| 2021/0200026 A1* | 7/2021 | Sonobe ............. G02F 1/133603 |
| 2021/0208330 A1* | 7/2021 | Sun ...................... G02B 6/0068 |
| 2022/0206337 A1 | 6/2022 | Kim et al. |

FOREIGN PATENT DOCUMENTS

| | | | |
|---|---|---|---|
| KR | 10-2007-0074951 A | | 7/2007 |
| KR | 20160076346 A | * | 6/2016 |
| KR | 10-2016-0141302 A | | 12/2016 |
| KR | 10-2019-0132124 A | | 11/2019 |
| KR | 10-2021-0037979 A | | 4/2021 |

OTHER PUBLICATIONS

International Search Report (PCT/ISA/210) dated Sep. 1, 2022 issued by the International Searching Authority in International Application No. PCT/KR2022/007117.

Written Opinion (PCT/ISA/237) dated Sep. 1, 2022 issued by the International Searching Authority in International Application No. PCT/KR2022/007117.

* cited by examiner

DISPLAY APPARATUS

CROSS-REFERENCE TO RELATED APPLICATION(S)

This application is a bypass continuation application of International Application No. PCT/KR2022/007117, filed on May 18, 2022, which claims priority to Korean Patent Application No. 10-2021-0084830, filed on Jun. 29, 2021 in the Korean Intellectual Property Office, the disclosures of which are incorporated herein by reference in their entireties.

BACKGROUND

1. Field

The disclosure relates generally to a display apparatus, and more particularly, to a display apparatus including a liquid crystal panel and a light source device.

2. Description of Related Art

In general, display apparatuses are a type of output devices for displaying obtained or stored electrical information for the user by converting the electrical information to visual information, and are used in various fields such as homes or workplaces.

There are many different display apparatuses such as monitor devices connected to personal computers (PCs) or server computers, portable computer systems, Global Positioning System (GPS) terminals, general television sets, Internet protocol televisions (IPTVs), portable terminals, e.g., smart phones, tablet PCs, personal digital assistants (PDAs), and cellular phones, any other display device for reproducing images like advertisements or films, or other various kinds of audio/video systems.

The display apparatus (e.g., a self-luminous display or a non-luminous display) includes a light source device to convert an electrical signal to a visual signal, and the light source device includes a plurality of point light sources capable of separately emitting light. The light source includes, for example, a light emitting diode (LED) or an organic LED (OLED).

Thicknesses of display apparatus are decreasing. Hence, the optical distance for converting the point light source to a surface light source is decreasing. Maintaining a level and uniformity of brightness of the display apparatus is required even with the decreasing optical distance.

To reduce the optical distance while maintaining the uniformity in brightness, the number of light sources needs to be increased.

SUMMARY

Provided is display apparatus capable of maintaining uniformity in brightness and minimizing the number of light sources while reducing the optical distance.

In accordance with an aspect of the disclosure, a display apparatus includes a liquid crystal panel, a substrate, and a plurality of light emitting diodes (LEDs) provided on one side of the substrate and configured to emit light towards the liquid crystal panel. Each of the plurality of LEDs may include a first reflection layer, a second reflection layer, and a light emitting layer provided between the first reflection layer and the second reflection layer. The second reflection layer may be provided between the substrate and the light emitting layer. A first reflectivity of the first reflection layer for a first light entering at a first incident angle may be different from a second reflectivity of the second reflection layer for the first light entering at the first incident angle.

The first reflectivity of the first reflection layer for the first light entering at the first incident angle may be greater than a third reflectivity of the first reflection layer for a second light entering at a second incident angle larger than the first incident angle.

At the first incident angle being equal to or less than a first reference angle, the first reflectivity of the first reflection layer for the first light may be equal to or greater than about 80%, and at the first incident angle exceeding the first reference angle, the first reflectivity of the first reflection layer for the first light entering at the first incident angle may be greater than a third reflectivity of the first reflection layer for a second light entering at a second incident angle greater than the first incident angle.

The first reference angle may be less than or equal to about 40 degrees.

At the first incident angle being about 60 degrees and the first incident angle being greater than the first reference angle, the first reflectivity of the first reflection layer for the first light may be between about 50% and about 80%.

The second reflectivity of the second reflection layer for the first light entering at the first incident angle may be equal to or greater than a fourth reflectivity of the second reflection layer for third light entering at a third incident angle that is less than the first incident angle.

At the first incident angle being equal to or greater than a second reference angle, the second reflectivity of the second reflection layer for the first light may be greater than or equal to about 80%, and at the first incident angle being less than the second reference angle, the second reflectivity of the second reflection layer for the first light entering at the first incident angle may be equal to or greater than a fourth reflectivity of the second reflection layer for third light entering at a third incident angle less than the first incident angle.

The second reference angle may be greater than or equal to about 60 degrees.

At the first incident angle being about 40 degrees and the first incident angle being less the second reference angle, the second reflectivity of the second reflection layer for the first light may be greater than or equal to about 50%.

The first reflectivity of the first reflection layer for the first light entering at the first incident angle may be greater than the second reflectivity of the second reflection layer for the first light when the first incident angle is less than or equal to about 40 degrees.

The first reflectivity of the first reflection layer for the first light entering at the first incident angle may be less than the second reflectivity of the second reflection layer for the first light when the first incident angle is greater than or equal to about 60 degrees.

Each of the first reflection layer and the second reflection layer may include a distributed Bragg reflector (DBR).

A first intensity of light emitted from each of the plurality of LEDs in a direction perpendicular to the first reflection layer may be less than a second intensity of light emitted from each of the plurality of LEDs in a direction not perpendicular to the first reflection layer.

The light emitted from the LED may include a highest intensity in a slanted direction at an angle between about 40 degrees and about 60 degrees from a perpendicular direction to the first reflection layer.

The display apparatus may include a plurality of optical domes respectively covering the plurality of LEDs separately, where each of the plurality of optical domes may include a diameter of about 10 mm or less and a height of about 5 mm or less.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
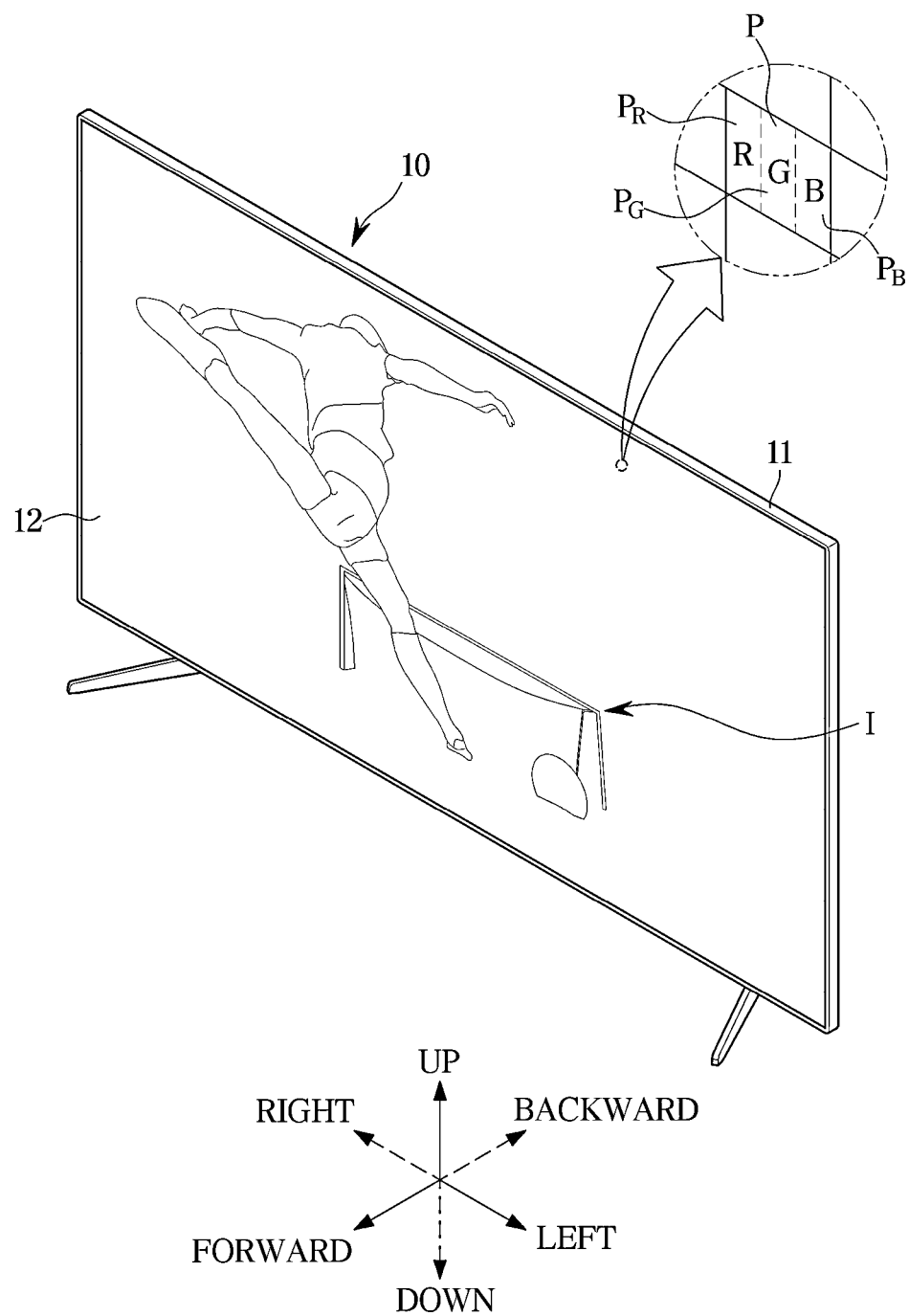
FIG. 1 is a diagram of a display apparatus, according to an embodiment.

The embodiments set forth herein and illustrated in the configuration of the disclosure are only examples and it would be appreciated by those skilled in the art that changes may be made in the example embodiments without departing from the principles and spirit of the disclosure.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, In the specification, it will be understood that, when a member is referred to as being "on/under" another member, it may be directly on/under the other member, or one or more intervening members may in addition be present.

The terms including ordinal numbers like "first" and "second" may be used to explain various components, but the components are not limited by the terms. The terms are only for the purpose of distinguishing a component from another.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise. Hereinafter, the operating principles and embodiments of the disclosure will be described with reference to the accompanying drawings.

The principle and embodiments of the disclosure will now be described with reference to accompanying drawings.

FIG. 1 is a diagram of a display apparatus, according to an embodiment.

A display apparatus 10 is a device that is able to process image signals received from the outside and visually present the processed image. In the following description, it is assumed that the display apparatus 10 is a television (TV), but embodiments of the disclosure are not limited thereto. For example, the display apparatus 10 may be implemented in various forms, such as a monitor, a portable multimedia device, a portable communication device, and any device capable of visually presenting images, without being limited thereto.

The display apparatus 10 may be a large format display (LFD) installed outdoors such as on a rooftop of a building or at a bus stop. The display apparatus 10 is not, however, exclusively installed outdoors, but may be installed at any place, even indoors with a lot of foot traffic, e.g., at subway stations, shopping malls, theaters, offices, stores, etc.

The display apparatus 10 may receive content including video and audio signals from various content sources and output video and audio corresponding to the video and audio signals. For example, the display apparatus 10 may receive content data through a broadcast receiving antenna or a cable, receive content data from a content reproducing device, or receive content data from a content providing server of a content provider.

As shown in FIG. 1, the display apparatus 10 may include a main body 11 and a screen 12 for displaying an image I.

The main body 11 forms the exterior of the display apparatus 10, and components for the display apparatus 10 to display the image I or perform many different functions may be included in the main body 11. Although the main body 11 of FIG. 1 is shaped like a flat plate, it is not limited thereto. For example, the main body 11 may have the form of a curved plate.

The screen 12 may be formed on the front of the main body 11 for displaying the image I. For example, the screen 12 may display still images or moving images. The screen 12 may also display two dimensional (2D) plane images, or three dimensional (3D) stereographic images using parallax of both eyes of the user.

The screen 12 may include, for example, a self-luminous panel (e.g., a light emitting diode (LED) panel or an organic LED (OLED) panel) capable of emitting light at first hand, or non-luminous panel (e.g., a liquid crystal panel) capable of passing or blocking light emitted from, for example, a light source device (e.g., a backlight unit).

A plurality of pixels P are formed on the screen 12, and the image I displayed on the screen 12 may be formed by the light emitted by each of the plurality of pixels P. For example, the light emitted by each of the plurality of pixels P may be combined like a mosaic into the image I on the screen 12.

Each of the plurality of pixels P may emit light in various colors and brightnesses. Each of the plurality of pixels P may include subpixels $P_R$, $P_G$, and $P_B$ to emit different colors of light.

The subpixels $P_R$, $P_G$, and $P_B$ may include a red subpixel $P_R$ to emit red light, a green subpixel $P_G$ to emit green light, and a blue subpixel PB to emit blue light PB. The red light may be defined as having wavelengths in the range of about 620 to 750 nm, where 1 nm is a billionth of a meter. The green light may have wavelengths in the range of about 495 to 570 nm. The blue light may have wavelengths in the range of about 450 to 495 nm.

By combinations of the red light of the red subpixel $P_R$, the green light of the green subpixel $P_G$, and the blue light of the blue subpixel $P_B$, each of the plurality of pixels P may emit various brightnesses and colors of light.

Figure 2:
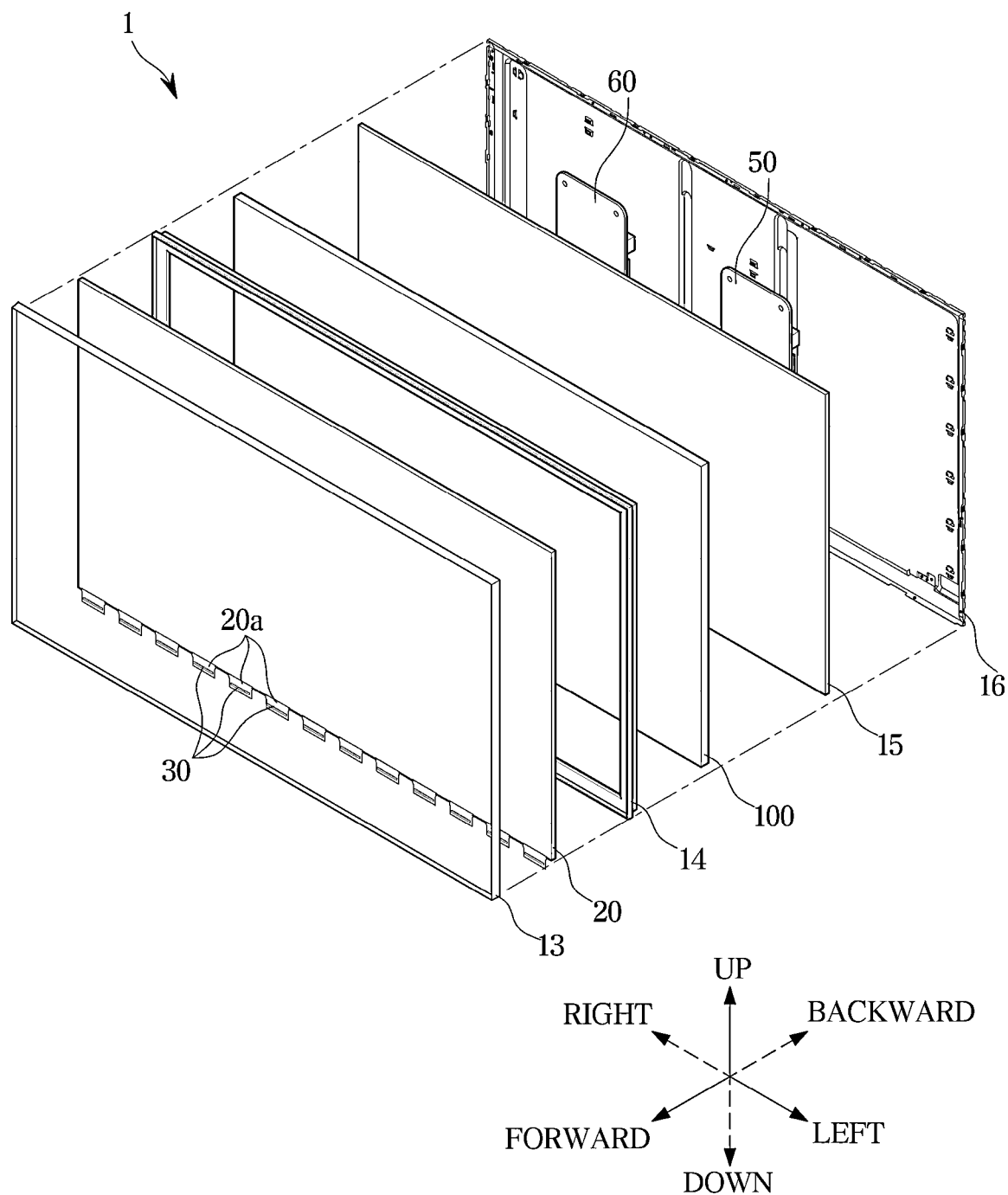
FIG. 2 is a diagram of a structure of a display apparatus, according to an embodiment.
Figure 3:
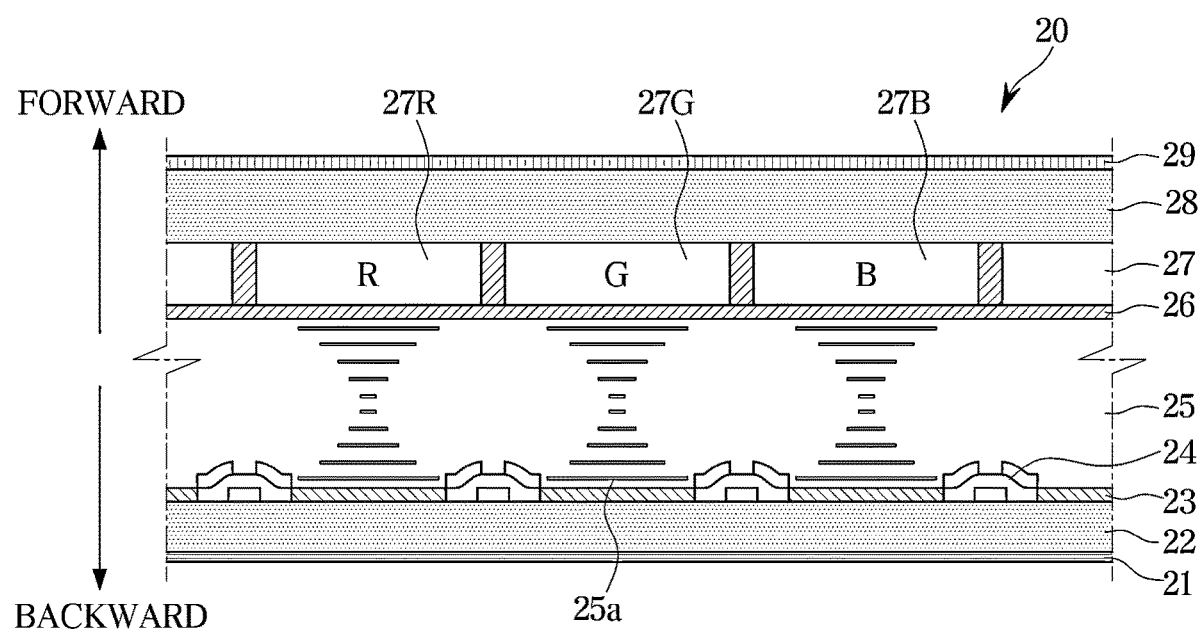
FIG. 3 is a diagram of a liquid crystal panel included in a display apparatus, according to an embodiment.

FIG. 2 is a diagram of a structure of a display apparatus, according to an embodiment. FIG. 3 is a diagram of a liquid crystal panel included in a display apparatus, according to an embodiment.

As shown in FIG. 2, the main body 11 may contain many different kinds of components to create the image I on the screen S.

For example, a light source device 100, which is a surface light source, a liquid crystal panel 20 for blocking or passing the light emitted from the light source device 100, a control assembly 50 for controlling operations of the light source device 100 and the liquid crystal panel 20, and a power assembly 60 for supplying power to the light source device 100 and the liquid crystal panel 20 are equipped in the may body 11. Furthermore, the main body 11 may include a bezel 13, a frame middle mold 14, a bottom chassis 15, and a rear cover 16 to support the liquid crystal panel 20, the light source device 100, the control assembly 50, and the power assembly 60.

The light source device 100 may include point light sources for emitting monochromatic light or white light. The light source device 100 may refract, reflect, and diffuse the light emitted from the point light sources to convert the light to uniform surface light. In this way, the light source device 100 may emit the uniform surface light in a forward direction by refracting, reflecting and scattering the light emitted from the point light source.

The light source device 100 will now be described in more detail.

The liquid crystal panel 20 is arranged in front of the light source device 100 for blocking or passing the light emitted from the light source device 100 to produce the image I.

The front surface of the liquid crystal panel 20 may form the screen S of the aforementioned display apparatus 10, and the liquid crystal panel 20 may include the plurality of pixels P. The liquid crystal panel 20 may block or pass the light from the light source device 100 separately. The light that has passed by the plurality of pixels P may form the image I displayed on the screen S.

For example, as shown in FIG. 3, the liquid crystal panel 20 may include a first polarizer film 21, a first transparent substrate 22, a pixel electrode 23, a thin film transistor (TFT) 24, a liquid crystal layer 25, a common electrode 26, a color filter 27, a second transparent substrate 28, and a second polarizer film 29.

The first transparent substrate 22 and the second transparent substrate 28 may securely support the pixel electrode 23, the TFT 24, the liquid crystal layer 25, the common electrode 26, and the color filter 27. The first and second transparent substrates 22 and 28 may be formed of tempered glass or transparent resin.

The first polarizer film 21 and the second polarizer film 29 are arranged on outer sides of the first and second transparent substrates 22 and 28. The first and second polarizer films 21 and 29 may each pass particularly polarized light while blocking (reflecting or absorbing) differently polarized light. For example, the first polarizer film 21 may pass polarized light of a first direction while blocking (reflecting or absorbing) differently polarized light. Furthermore, the second polarizer film 29 may pass polarized light of a second direction while blocking (reflecting or absorbing) differently polarized light. The first and second directions may be perpendicular to each other. As a result, the polarized light that has passed the first polarizer film 21 may not directly pass the second polarizer film 29.

The color filter 27 may be arranged on the inner side of the second transparent substrate 28. The color filter 27 may include, for example, a red color filter 27R for passing red light, a green color filter 27G for passing green light, and a blue color filter 27B for passing blue light. Furthermore, the red, green, and blue color filters 27R, 27G, and 27B may be arranged side by side. An area occupied by the color filter 27 corresponds to the pixel P as described above. An area occupied by the red color filter 27R corresponds to the red subpixel $P_R$; an area occupied by the green color filter 27G corresponds to the green subpixel $P_G$; an area occupied by the blue color filter 27B corresponds to the blue subpixel $P_B$.

The pixel electrode 23 may be arranged on the inner side of the first transparent substrate 22, and the common electrode 26 may be arranged on the inner side of the second transparent substrate 28. The pixel electrode 23 and the common electrode 26 are formed of a conductive metal material, and may produce an electric field to change arrangement of liquid crystal molecules 115a that form the liquid crystal layer 25, which will be described below.

The TFT 24 is arranged on the inner side of the second transparent substrate 22. The TFT 24 may be turned on (closed) or turned off (opened) by image data provided from a panel driver 30. Furthermore, depending on whether the TFT 24 is turned on (closed) or turned off (opened), an electric field may be formed or removed from between the pixel electrode 23 and the common electrode 26.

The liquid crystal layer 25 may be formed between the pixel electrode 23 and the common electrode 26 and filled with liquid crystal molecules 25a. The liquid crystals may be in an intermediate state between solid (crystal) and fluid.

The liquid crystals may reveal an optical property according to a change in electric field. For example, the liquid crystal may have varying directions of arrangement of molecules that form the liquid crystal, according to a change in electric field. Consequently, the optical property of the liquid crystal layer 25 may be changed according to whether there is an electric field passing the liquid crystal layer 25. For example, the liquid crystal layer 25 may rotate polarization direction of light around an optical axis depending on whether there is an electric field. Hence, the polarized light that has passed the first polarizer film 21 may have a rotating polarization direction while passing the liquid crystal layer 25 and may pass the second polarizer film 29.

On one side of the liquid crystal panel 20, provided are a cable 20a for transmitting image data to the liquid crystal panel 20 and a display driver integrated circuit (DDI) 30 (hereinafter, referred to as a 'panel driver') for processing digital image data to output an analog image signal.

The cable 20a may electrically connect between the control assembly 50/the power assembly 60 and the panel driver 30 and further between the panel driver 30 and the liquid crystal panel 20. The cable 20a may include, for example, a flexible flat cable that is bendable or a film cable.

The panel driver 30 may receive image data and power from the control assembly 50/power assembly 60 through the cable 20a. The panel driver 30 may also provide image data and a driving current to the liquid crystal panel 20 through the cable 20a.

Furthermore, the cable 20a and the panel driver 30 may be integrally implemented as a film cable, a chip on film (COF), a table carrier package (TCP), etc. In other words, the panel driver 30 may be arranged on the cable 20a. It is not, however, limited thereto, and the panel driver 30 may be arranged on the liquid crystal panel 20.

The control assembly 50 may include a control circuit for controlling operations of the liquid crystal panel 20 and the light source device 100. For example, the control circuit may process a video signal and/or an audio signal received from an external content source. The control circuit may transmit image data to the liquid crystal panel 20, and transmit dimming data to the light source device 100.

The power assembly 60 may include a power circuit for supplying power to the liquid crystal panel 20 and the light source device 100. The power circuit may supply power to the control assembly 50, the light source device 100, and the liquid crystal panel 20.

The control assembly 50 and the power assembly 60 may be implemented with printed circuit boards (PCBs) and various circuits mounted on the PCBs. For example, the power circuit may include a power circuit board, and a capacitor, a coil, a resistor, a processor, etc., which are mounted on the power circuit board. Furthermore, the control circuit may include a control circuit board with a memory and a processor mounted thereon.

Figure 4:
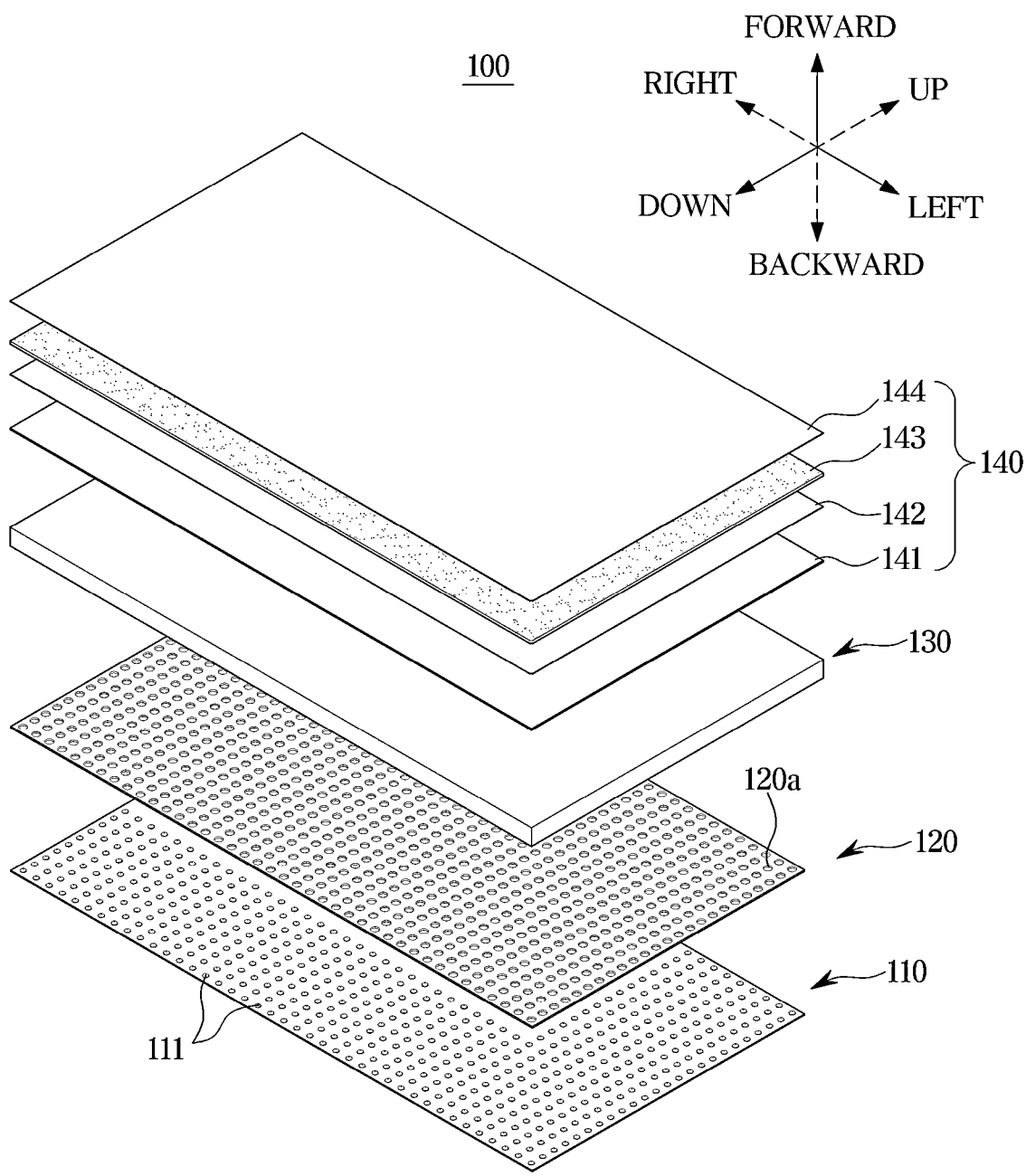
FIG. 4 is a diagram of a light source device included in a display apparatus, according to an embodiment.
Figure 5:
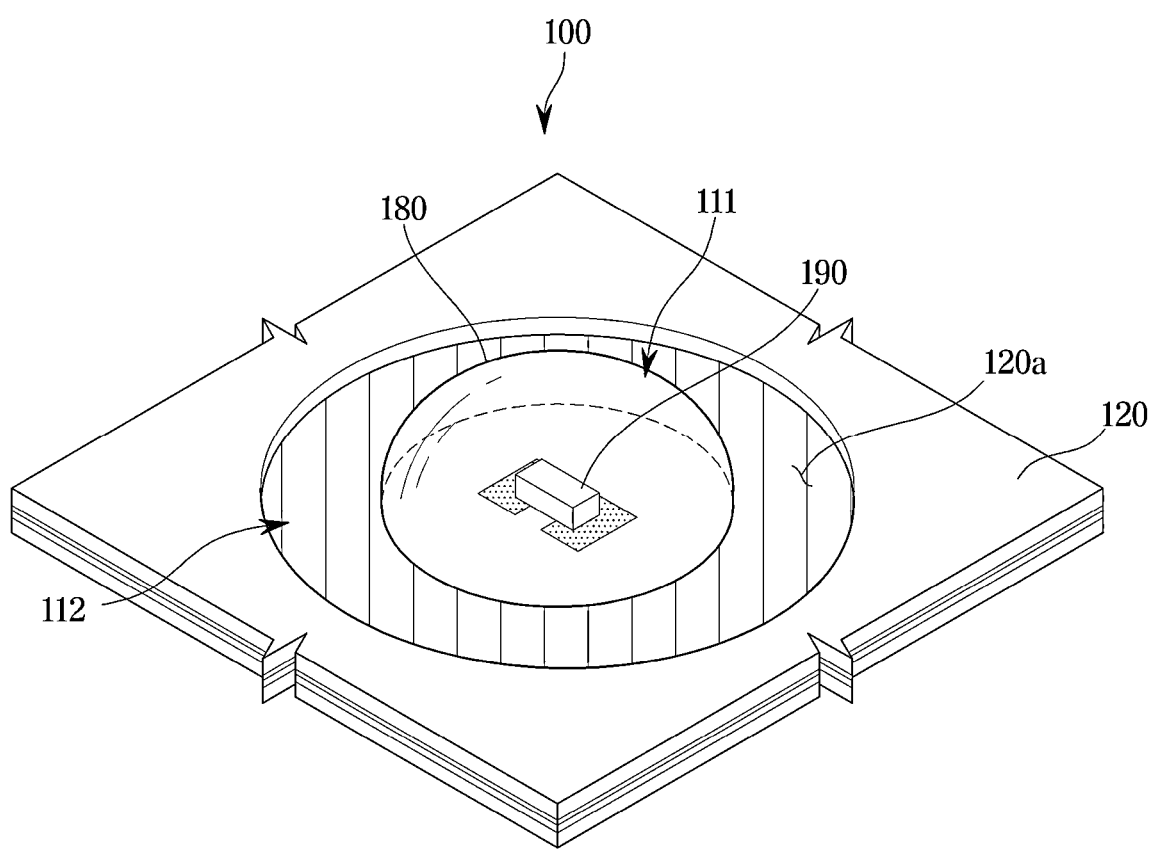
FIG. 5 is a diagram of a light source included in a light source device, according to an embodiment.

FIG. 4 is a diagram of a light source device included in a display apparatus, according to an embodiment. FIG. 5 is a diagram of a light source included in a light source device, according to an embodiment.

Referring to FIG. 4, the light source device 100 may include a light source module 110 for generating light, a reflection sheet 120 for reflecting light, a diffuser plate 130 for uniformly diffusing light, and an optical sheet 140 for enhancing brightness of output light.

The light source module 110 may include a plurality of light sources 111 for emitting light, and a substrate 112 for supporting/fixing the plurality of light sources 111.

The plurality of light sources 111 may be arranged in a predefined pattern to emit light with uniform brightness. The plurality of light sources 111 may be arranged such that a light source is equidistant from its neighboring light sources.

For example, as shown in FIG. 4, the plurality of light sources 111 may be arranged in rows and columns. Accordingly, the plurality of light sources may be arranged such that neighboring four light sources form almost a rectangle. Furthermore, a light source is located to be adjacent to four other light sources, and the distances between the light source and the four neighboring light sources may be almost the same.

Alternatively, the plurality of light sources may be arranged such that neighboring three light sources form almost a triangle. In this case, a light source may be arranged to be adjacent to six other light sources. The distances between the light source and the six neighboring light sources are almost the same.

The arrangement of the plurality of light sources 111 is not, however, limited thereto, and the plurality of light sources 111 may be arranged in various ways to emit light in even brightness.

The light sources 111 may employ a device capable of emitting monochromatic light (light having a wavelength in a particular range or light having a peak wavelength, e.g., blue light) or white light (light having a plurality of peak wavelengths, e.g., a mixture of red light, green light, and blue light) to various directions when powered.

Referring to FIG. 5, each of the plurality of light sources 111 may include an LED 190 and an optical dome 180.

The thinner the thickness of the display apparatus 10, the thinner the thickness of the light source device 100. To make the light source device 100 become thinner, each of the plurality of light sources 111 gets thinner and the structure becomes simpler.

The LED 190 may be attached directly to the substrate 112 in a method of chip on board (COB). For example, the light source 111 may include the LED 190 with an LED chip or an LED die attached directly to the substrate 112 without extra packaging.

The LED 190 may be manufactured in a flip chip type. The LED 190 of the flip chip type may not use an intermediate medium such as a metal lead (wire) or a ball grid array (BGA) to attach the LED, which is a semiconductor device, to the substrate 112, but may fuse an electrode pattern of the semiconductor device onto the substrate 112 as it is. This may make it possible for the light source 111 including the LED 190 of the flip chip type to become smaller by omitting the metal lead (wire) or the ball grid array.

Although the LED 190 is described above as having a flip chip type directly fused onto the substrate 112 in the COB method, the light source 111 is not limited to the flip chip type LED. For example, the light source 111 may include a package type LED.

The optical dome 180 may cover the LED 190. The optical dome 180 may prevent or suppress damage to the LED 190 due to an external mechanical action and/or chemical action.

The optical dome 180 may be shaped like, for example, a dome obtained by cutting a sphere without including the center or a semi-sphere obtained by cutting the sphere with the center included. A vertical cross-section of the optical dome 180 may have, for example, an arcuate form or a semi-circular form.

The optical dome 180 may be formed of silicon or epoxy resin. For example, melted silicon or epoxy resin is discharged onto the LED 190 through, for example, a nozzle, and then hardened to form the optical dome 180.

Generally, the optical dome 180 may have a diameter of about 10 mm or less and a height of about 5 mm or less. More specifically, the optical dome 180 may have a diameter of about 3 mm or less and a height of about 1 mm or less.

The optical dome 180 may be optically transparent or translucent. Light emitted from the LED 190 may pass through the optical dome 180 to the outside.

In this case, the dome-shaped optical dome 180 may refract the light like a lens. For example, the light emitted from the LED 190 may be refracted and dispersed by the optical dome 180.

As such, the optical dome 180 may not only protect the LED 190 from an external mechanical action and/or chemical action or electrical action, but also scatter the light emitted from the LED 190.

Although the optical dome 180 is described as being dome-shaped, the light source 111 is not limited to including the optical dome 180. For example, the light sources 111 may include a lens for diffusing the light emitted from the LED.

The substrate 112 may fix the plurality of light sources 111 to prevent the light sources 111 from being moved. In addition, the substrate 112 may supply power to each of the light sources 111 so that the light source 111 may emit light.

The substrate 112 may secure the plurality of light sources 111. The substrate 112 may be formed of a synthetic resin, tapered glass or a PCB with conductive power supply lines formed therein to supply power to the light sources 111.

The reflection sheet 120 may reflect light emitted from the plurality of light sources 111 to a forward direction or to a nearly forward direction.

A plurality of through holes 120*a* are formed on the reflection sheet 120 at positions matching the plurality of light sources 111 of the light source module 110. Furthermore, the light sources 111 of the light source module 110 may pass the through holes 120*a* and protrude forward from the reflection sheet 120. Accordingly, the plurality of light sources 111 may emit light from the front of the reflection sheet 120. The reflection sheet 120 may reflect the light emitted toward the reflection sheet 120 from the plurality of light sources 111 toward the diffuser plate 130.

The diffuser plate 130 may be arranged in front of the light source module 110 and the reflection sheet 120. The diffuser plate 130 is able to uniformly diffuse the light emitted from the light sources 111 of the light source module 110.

As described above, the plurality of light sources 111 are equidistantly arranged on the rear side of the light source device 100. This may cause non-uniformity in brightness depending on the locations of the plurality of light sources 111.

To avoid the non-uniformity in brightness due to the plurality of light sources 111, the diffuser plate 130 may diffuse the light emitted from the plurality of light sources 111 within the diffuser plate 130. In other words, the diffuser plate 130 may uniformly emit non-uniform light forward from the plurality of light sources 111.

The optical sheet 140 may include various sheets to improve brightness and uniformity in brightness. For example, the optical sheet 140 may include a light conversion sheet 141, a diffuser sheet 142, a prism sheet 143, and a reflective polarizer sheet 144, etc.

The optical sheet 140 is not limited to the sheets or films as illustrated in FIG. 4, and may further include other various sheets or films such as protective sheets.

Figure 6:
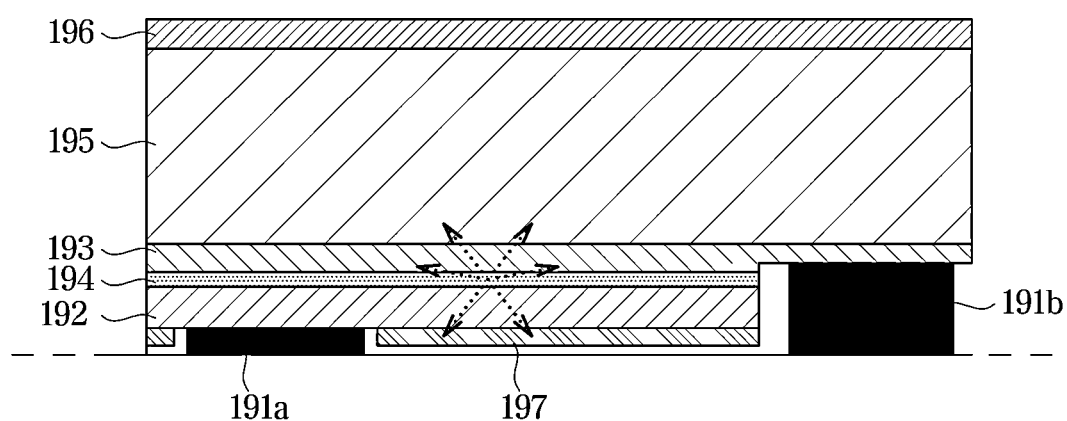
FIG. 6 is a diagram of a light emitting diode (LED) included in a light source device, according to an embodiment.
Figure 7:
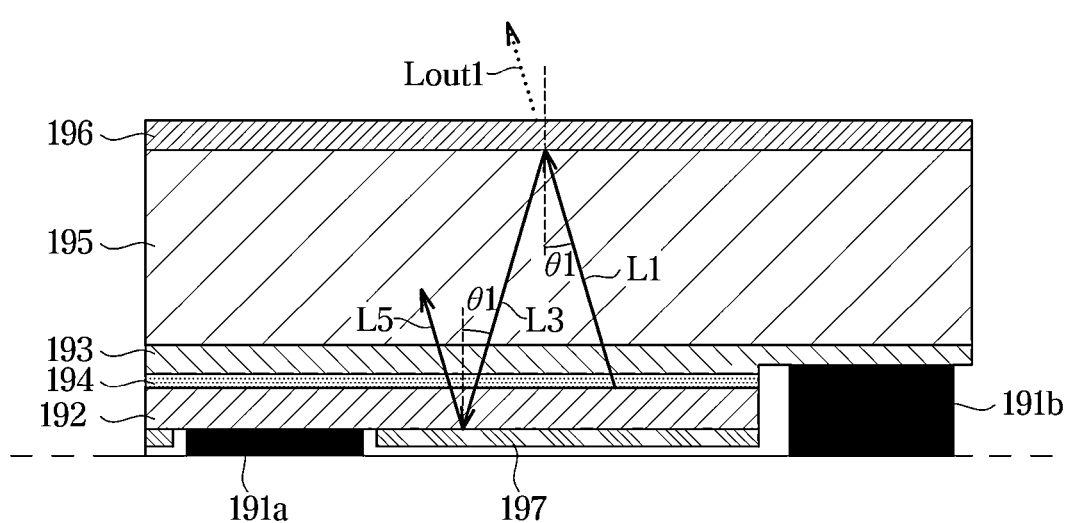
FIG. 7 is a diagram of propagation of light entering the LED as shown in FIG. 6 at a small incident angle, according to an embodiment.
Figure 8:
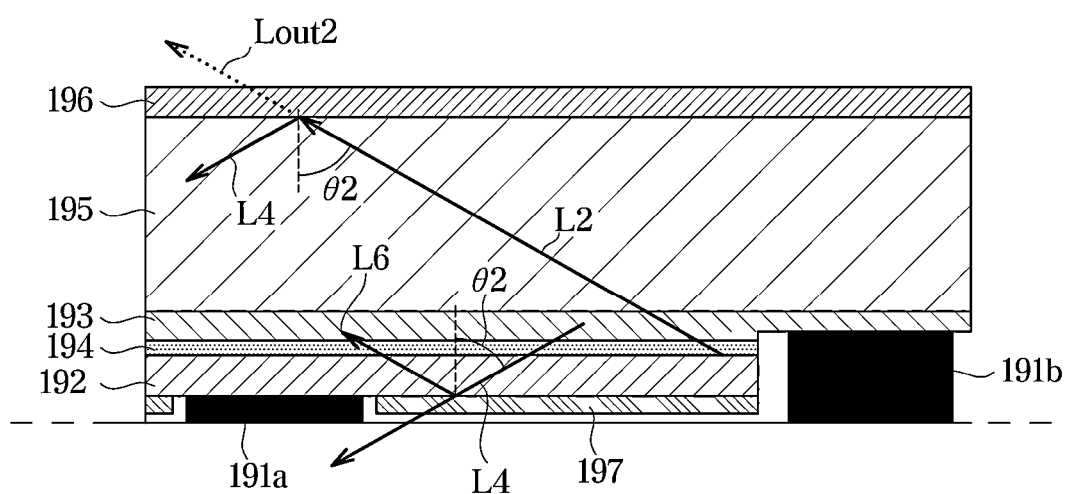
FIG. 8 is a diagram of propagation of light entering the LED as shown in FIG. 6 at a large incident angle, according to an embodiment.
Figure 9:
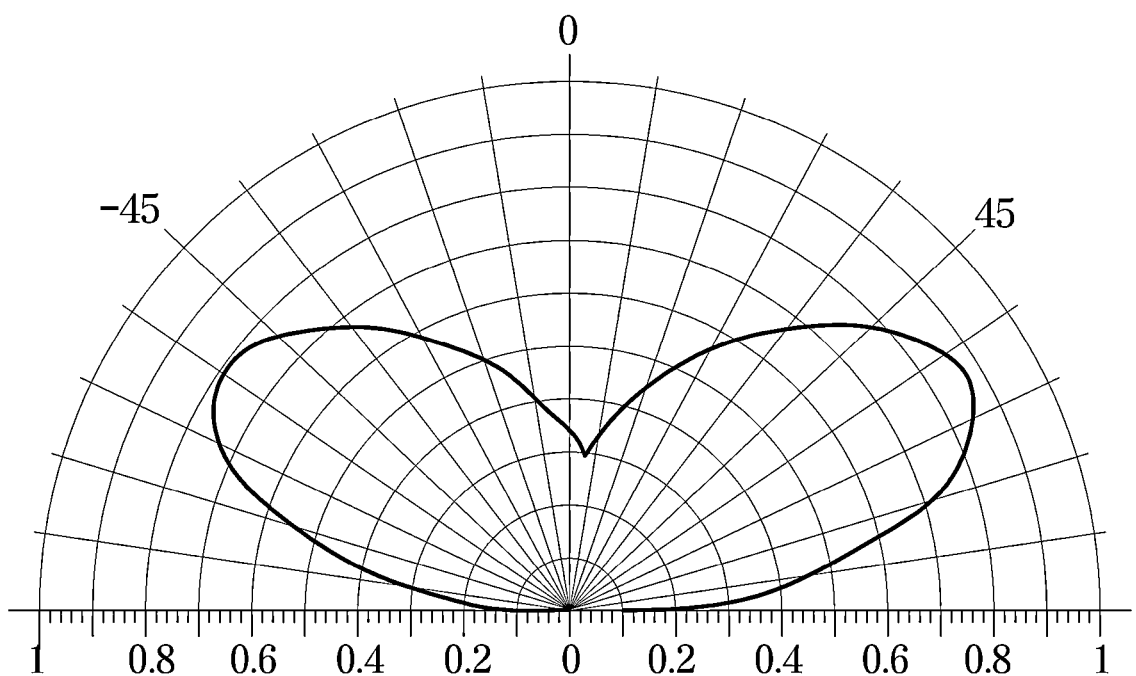
FIG. 9 is a diagram of intensities of light from the LED as shown in FIG. 6 depending on exit angles, according to an embodiment.

FIG. 6 is a diagram of a light emitting diode (LED) included in a light source device, according to an embodiment. FIG. 7 is a diagram of propagation of light entering the LED as shown in FIG. 6 at a small incident angle, according to an embodiment. FIG. 8 is a diagram of propagation of light entering the LED as shown in FIG. 6 at a large incident angle, according to an embodiment. FIG. 9 is a diagram of intensities of light from the LED as shown in FIG. 6 depending on exit angles, according to an embodiment.

Referring to FIG. 6, the LED 190 may include a transparent substrate 195, an n-type semiconductor layer 193, and a p-type semiconductor layer 192. A multi quantum wells (MQW) layer 194 is formed between the n-type semiconductor layer 193 and the p-type semiconductor layer 192.

The transparent substrate 195 may be a base of p-n junction which may emit light. The transparent substrate 195 may contain, for example, sapphire $Al_2O_3$ having a similar crystal structure to the semiconductor layers 192 and 193.

The p-n junction may be formed by joining the n-type semiconductor layer 193 and the p-type semiconductor layer 192. A depletion region may be created between the n-type semiconductor layer 193 and the p-type semiconductor layer 192. Electrons of the n-type semiconductor layer 193 and holes of the p-type semiconductor layer 192 may be recombined in the depletion region. Light may be emitted due to the recombining of electrons and holes.

The n-type semiconductor layer 193 may include, for example, n-type gallium nitride (GaN). The p-type semiconductor layer 192 may include, for example, p-type GaN. Energy band gap of GaN is 3.4 electronvolt (eV) at which to emit light having a wavelength shorter than about 400 nm. Hence, from the junction between the n-type semiconductor layer 193 and the p-type semiconductor layer 192, (deep) blue light or ultraviolet (UV) rays may be emitted.

The n-type semiconductor layer 193 and the p-type semiconductor layer 192 are not limited to gallium nitride GaN, and other various semiconductor materials may be used for the light required.

A first electrode 191*a* of the LED 190 electrically contacts the p-type semiconductor layer 192, and a second electrode 191*b* electrically contacts the n-type semiconductor layer 193. The first electrode 191*a* and the second electrode 191*b* may serve not only as electrodes but also as reflectors that reflect light.

When a voltage is applied to the LED 190, holes may be supplied to the p-type semiconductor layer 192 through the first electrode 191*a* and electrons may be supplied to the n-type semiconductor layer 193 through the second electrode 191*b*. Electrons and holes may be recombined in the depletion region formed between the p-type semiconductor layer 192 and the n-type semiconductor layer 193. During the recombining of electrons and holes, energy (e.g., kinetic energy and potential energy) of the electrons and the holes may be converted to light energy. In other words, when electrons and holes are recombined, light may be emitted.

In this case, the energy gap of the MQW layer 194 is smaller than the energy gap of the p-type semiconductor layer 192 and/or the n-type semiconductor layer 193. Hence, the holes and electrons may be captured in the MQW layer 194.

The holes and electrons captured in the MQW layer 194 may be easily recombined in the MQW layer 194. This may increase light emitting efficiency of the LED 190.

From the MQW layer 194, light having a wavelength corresponding to the energy gap of the MQW layer 194 may be emitted. For example, from the MQW layer 194, blue light of 420 nm to 480 nm may be emitted.

The light produced by recombination of the electron and the hole may be emitted not in a particular direction but in all directions, as shown in FIG. 6. As for the light emitted from a plane like the MQW layer 194, the light generally has the highest intensity when emitted in a perpendicular direction from the emitting plane and the lowest intensity when emitted in a direction parallel to the emitting plane.

On the outer side (an upper side shown in, for example, FIGS. 6-9) of the transparent substrate 195, arranged is the first reflection layer 196. On the outer side (a lower side shown in, for example, FIGS. 6-9) of the p-type semiconductor layer 192, arranged is the second reflection layer 197. In this way, the transparent substrate 195, the n-type semiconductor layer 193, the MQW layer 194, and the p-type semiconductor layer 192 may be arranged between the first reflection layer 196 and the second reflection layer 197.

The first reflection layer 196 and the second reflection layer 197 may each reflect a portion of incident light while passing the other portions of the incident light.

For example, the first reflection layer 196 and the second reflection layer 197 may reflect light having a wavelength in a particular wavelength range while passing light having a wavelength out of the particular wavelength range. Specifically, the first reflection layer 196 and the second reflection layer 197 may reflect the blue light having a wavelength between 420 nm and 480 nm emitted from the MQW layer 194.

Furthermore, the first reflection layer 196 and the second reflection layer 197 may reflect the incident light having a particular incident angle and pass light that deviates from the particular incident angle.

For example, the first reflection layer 196 may reflect light entering at a small incident angle and pass light entering at a large incident angle. Furthermore, the second reflection layer 197 may reflect or pass light entering at a small incident angle and reflect light entering at a large incident angle. The incident light may be blue light having a wavelength between 420 nm and 480 nm.

Referring to FIG. 7, first light L1 generated from the MQW layer 194 may be propagated towards the first reflection layer 196 through the n-type semiconductor layer 193 and the transparent substrate 195. The first light L1 may enter the first reflection layer 196 at a first incident angle θ1. For example, the first incident angle θ1 may be 40 degrees or less.

Referring to FIG. 8, second light L2 generated from the MQW layer 194 may also be propagated towards the first reflection layer 196 through the n-type semiconductor layer 193 and the transparent substrate 195. The second light L2 may enter the first reflection layer 196 at a second incident angle θ2. The second incident angle θ2 of the second light L2 may be larger than the first incident angle θ1 of the first light L1. For example, the second incident angle θ2 may be 60 degrees or more.

A portion of the first light L1 (Lout1, hereinafter referred to as first exit light) entering the first reflection layer 196 may pass the first reflection layer 196, and other portions of the first light L1 (L3, hereinafter referred to as third light) may be reflected from the first reflection layer 196.

Furthermore, a portion of the second light L2 (Lout2, hereinafter referred to as second exit light) entering the first reflection layer 196 may pass the first reflection layer 196, and other portions of the second light L2 (L4, hereinafter referred to as fourth light) may be reflected from the first reflection layer 196.

The first exit light Lout1 may be emitted from the LED 190 at a relatively small first exit angle θ1. The second exit light Lout2 may be emitted from the LED 190 at a second exit angle θ2 larger than the first exit angle θ1.

As described above, the first reflection layer 196 may reflect light entering at a small incident angle and pass light entering at a large incident angle.

In other words, reflectivity of the first reflection layer 196 for light entering at a small incident angle may be high, and reflectivity of the first reflection layer 196 for light entering at a large incident angle may be low. For example, reflectivity of the first reflection layer 196 for light entering at an incident angle of about 40 degrees or less may be about 80% or higher, and reflectivity of the first reflection layer 196 for light entering at an incident angle of about 60 degrees may be about 50% to 80%.

Hence, a large portion of the first light L1 entering the first reflection layer 196 at the first incident angle θ1 may be reflected, and a small portion of the first light L1 may pass the first reflection layer 196. Furthermore, a large portion of the second light L2 entering the first reflection layer 196 at the second incident angle θ2 larger than the first incident angle θ1 may pass the first reflection layer 196.

Consequently, the intensity of the second exit light Lout2 that has passed the first reflection layer 196 may be higher than the intensity of the first exit light Lout1 that has passed the first reflection layer 196. In this case, an exit angle of the second exit light Lout2 may be larger than an exit angle of the first exit light Lout1.

In other words, the intensity of light emitted obliquely may be higher than the intensity of light emitted in a perpendicular direction from the LED 190.

As shown in FIG. 7, the third light L3 produced from the MQW layer 194 or reflected from the first reflection layer 196 may be propagated towards the second reflection layer 197 through the p-type semiconductor layer 192. The third light L3 may enter the second reflection layer 197 at the first incident angle θ1.

Furthermore, as shown in FIG. 8, the fourth light L4 produced from the MQW layer 194 or reflected from the first reflection layer 196 may be propagated towards the second reflection layer 197 through the p-type semiconductor layer 192. The fourth light L4 may enter the second reflection layer 197 at the second incident angle θ2. The second incident angle θ2 of the fourth light L4 may be larger than the first incident angle θ1 of the third light L3.

A portion of the second light L2 entering the second reflection layer 197 may pass the second reflection layer 197, and other portions of the first light L1 (L5, hereinafter referred to as fifth light) may be reflected from the second reflection layer 197.

Furthermore, a portion of the fourth light L4 entering the second reflection layer 197 may also pass the second reflection layer 197, and other portions of the second light L2 (L6, hereinafter referred to as sixth light) may be reflected from the second reflection layer 197.

As described above, the second reflection layer 197 may reflect or pass the light entering at a small incident angle and reflect the light entering at a large incident angle.

In other words, reflectivity of the second reflection layer 197 for the light entering at a large incident angle is high. Furthermore, reflectivity of the second reflection layer 197 for the light entering at a small incident angle is not defined. For example, reflectivity of the second reflection layer 197 for the light with the incident angle between about 60 degrees and about 80 degrees may be about 80% or higher, and reflectivity of the second reflection layer 197 for light with an incident angle of about 40 degrees may be about 40% or higher. As such, the reflectivity of the second reflection layer 197 for light entering at a small incident angle may be equal to or higher than the reflectivity of the second reflection layer 197 for light entering at a large incident angle.

Accordingly, a large portion of the fourth light L4 entering the second reflection layer 197 at the second incident angle θ2 may be reflected and then propagated back toward the first reflection layer 196. Furthermore, the third light L3 entering the second reflection layer 197 at the first incident angle θ1 may pass or reflect off the second reflection layer 197.

As a result, a large portion of the fourth light L4 entering the second reflection layer 197 at the second incident angle θ2 may be propagated back toward the first reflection layer 196, and may pass the first reflection layer 196 and exit out of the LED 190. The third light L3 entering the second reflection layer 197 at the first incident angle θ1 may pass the second reflection layer 197 and may be absorbed into the substrate 112, or may be absorbed into the transparent substrate 195 while continuing to reflect off the first reflection layer 196 and the second reflection layer 197.

As such, a large portion of the light entering the first reflection layer 196 at the first incident angle θ1 of 40 degrees or less may not pass the first reflection layer 196, and most of the light entering the first reflection layer 196 at the second incident angle θ2 of 60 degrees or more may not pass the first reflection layer 196. Furthermore, of the light emitted from the MQW layer 194, a portion emitted in the perpendicular direction from the emitting plane (the light entering the first reflection layer 196 at a small incident angle) may have the highest intensity. The light emitted in a direction parallel to the emitting plane (the light entering the first reflection layer 196 at a large incident angle) may have the lowest intensity.

Hence, the intensity of light emitted in a direction D1 perpendicular to the top surface of the LED 190 (in the upper direction of the LED 190 in the drawing) may be lower than the intensity of light emitted in a direction D2 slanted to the top surface of the LED 190 (e.g., a direction slanted from the upper direction in the drawing at about 40 to 60 degrees).

For example, as shown in FIG. 9, light emitted at an angle of about 40 to 60 degrees from the vertical axis of the LED 190 may have the highest intensity. Referring to FIG. 9, the LED 190 may have a roughly bat-wing shaped light profile. The bat-wing shaped light profile may represent a light profile with the intensity of light exiting in a slanted direction (e.g., in a direction at about 50 to 60 degrees from the vertical axis of the emitting plane, e.g., the MQW layer 194) higher than the intensity of light exiting in the vertical direction of the emitting plane of the LED 190.

With the bat-wing shaped light profile, the number of LEDs 190 to be included in the display apparatus 10 may be reduced.

To improve image quality of the display apparatus 10, it is important for the light source device 100 to emit surface light with uniform brightness. For example, with the reduced number of LEDs, which are point light sources, the difference in brightness between a region where the LED is located and a region where the LED is not located (i.e., a region between the LEDs) may increase. In other words, with the decreasing number of the point light sources, LEDs, uniformity in brightness of the surface light emitted by the light source device 100 may become worse.

In this case, with the use of the LEDs 190 having the bat-wing shaped light profile, the difference in brightness between the region where the LED is located and the region between the LEDs may decrease. This may reduce the number of LEDs 190.

Further, the thinner the thickness of the display apparatus 10, the shorter the optical distance that allows the light emitted from the point light sources, the LEDs, to be diffused into the surface light. Hence, the uniformity in brightness of the surface light emitted by the light source device 100 may become worse. To maintain uniformity in brightness, the number of LEDs may increase.

In this case, with the use of the LED 190 having the bat-wing shaped light profile, the increase in the number of LEDs 190 may be minimized.

As such, the LED 190 having the bat-wing shaped light profile may improve uniformity in brightness of the light source device 100. Accordingly, the number of LEDs 190 may be reduced while maintaining the uniformity in brightness of the light source device 100.

Figure 10:
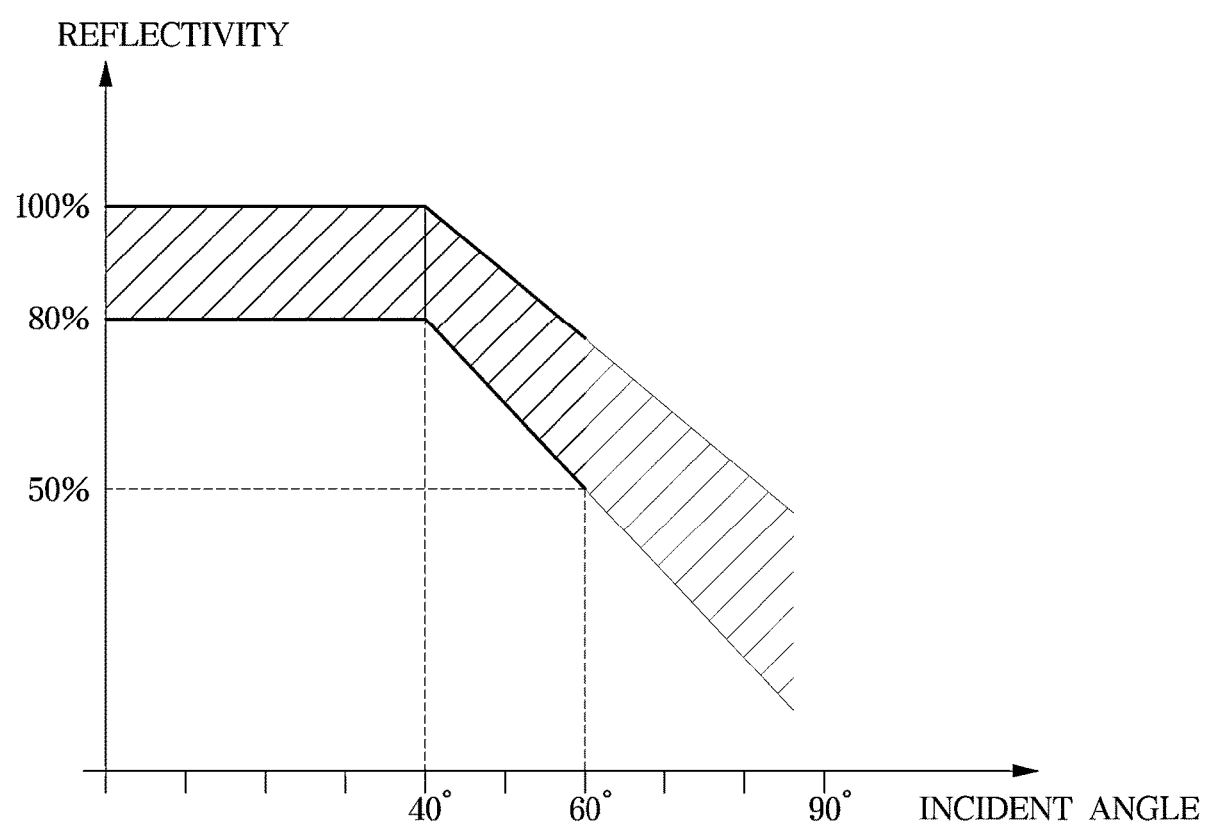
FIG. 10 is a diagram of reflectivity of a first reflection layer included in a light source device depending on incident angles, according to an embodiment.
Figure 11:
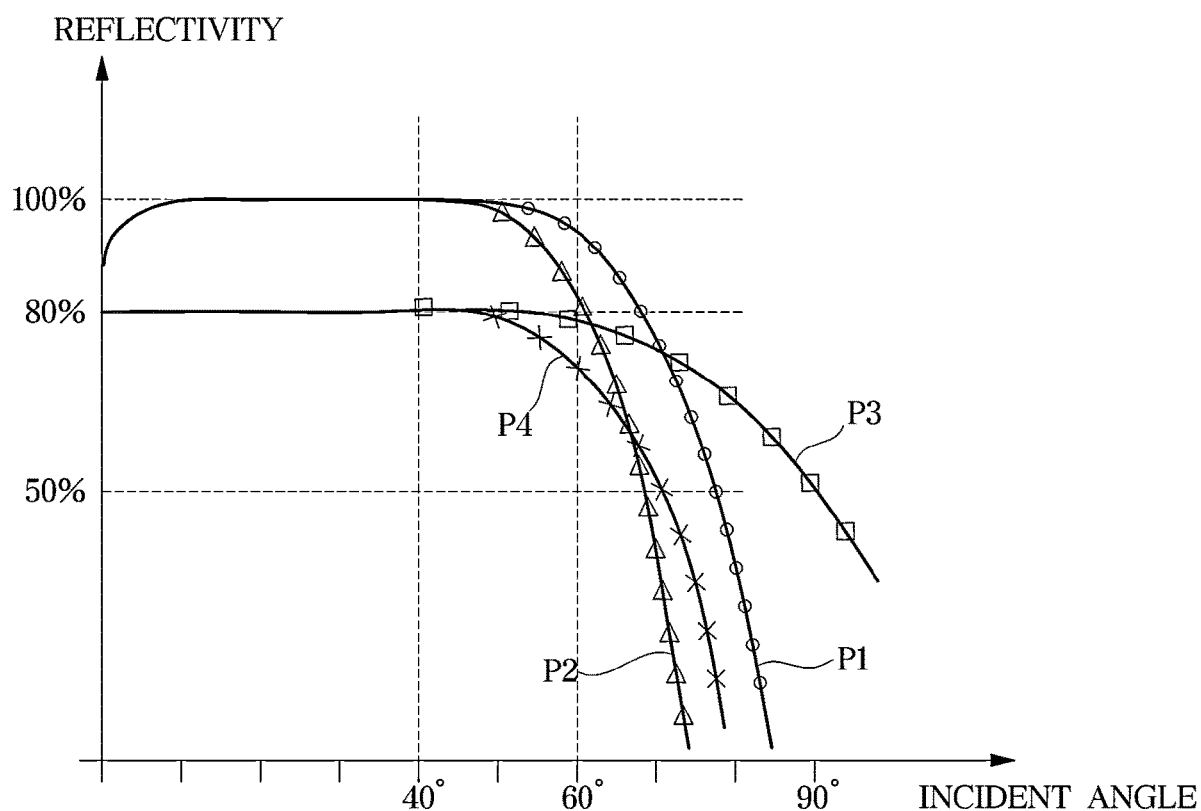
FIG. 11 is a diagram of reflectivity depending on incident angles as shown in FIG. 10, according to an embodiment.
Figure 12:
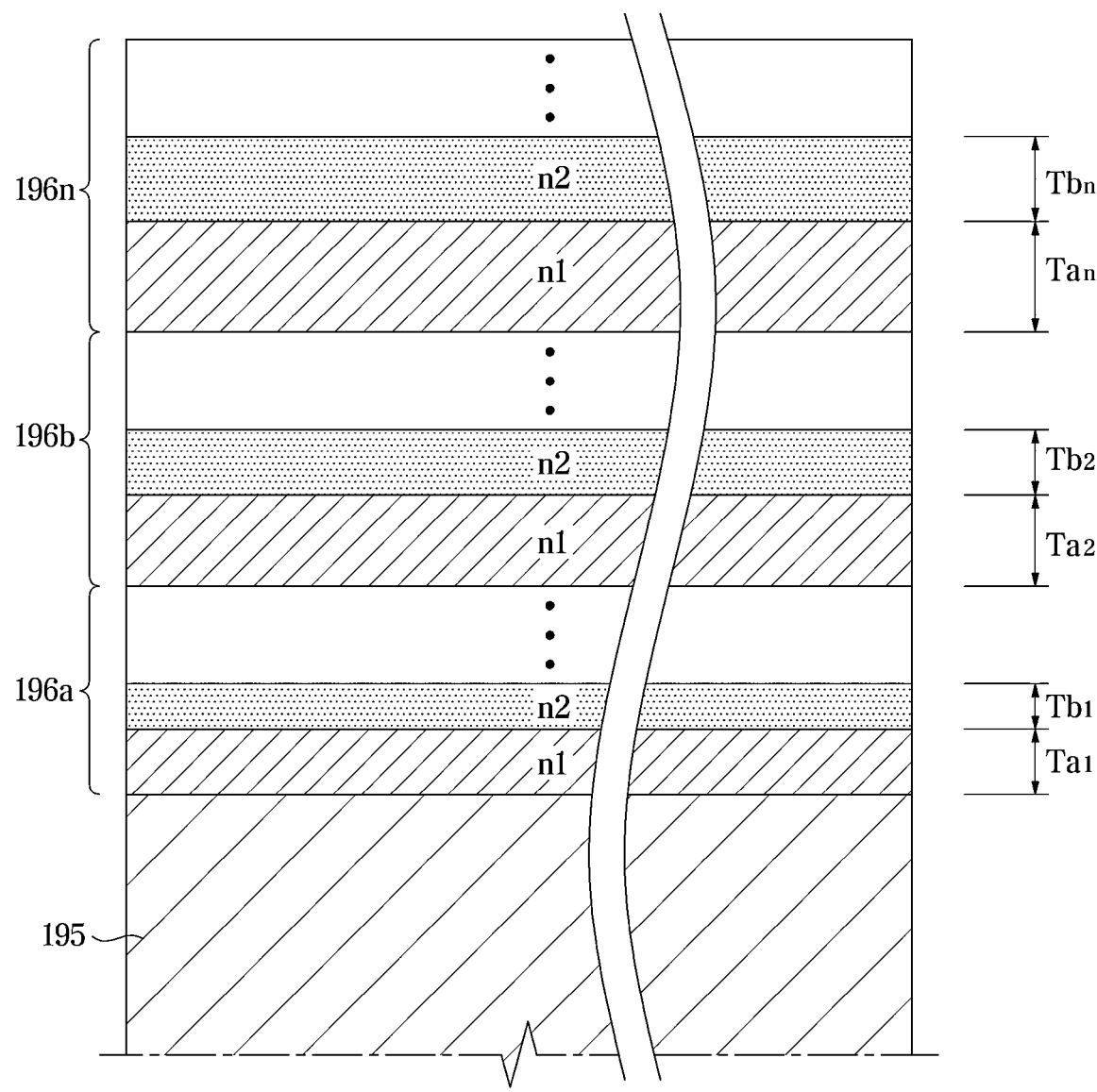
FIG. 12 is a diagram of a first reflection layer having reflectivity depending on incident angles as shown in FIG. 10, according to an embodiment.

FIG. 10 is a diagram of reflectivity of a first reflection layer included in a light source device depending on incident angles, according to an embodiment. FIG. 11 is a diagram of reflectivity depending on incident angles as shown in FIG. 10, according to an embodiment. FIG. 12 is a diagram of a first reflection layer having reflectivity depending on incident angles as shown in FIG. 10, according to an embodiment.

Referring to FIG. 10, reflectivity of the first reflection layer 196 included in the LED 190 may decrease with an increasing incident angle.

For example, the first reflection layer 196 may have a reflectivity of about 80% or higher for light entering at an incident angle of about 40 degrees or less. Specifically, most of light emitted in a substantially vertical direction of the emitting plane (e.g., the MQW layer 194) of the LED 190 may be reflected from the first reflection layer 196. Furthermore, most of light emitted slantingly at an angle of less than 40 degrees from the vertical direction of the emitting plane may also be reflected from the first reflection layer 196.

The first reflection layer 196 may have a reflectivity of about 50% to 80% for the light entering at an incident angle of about 60 degrees. As such, an allowable maximum value of the reflectivity of the first reflection layer 196 at an incident angle between 40 and 60 degrees may be reduced from 100% to 80%. Furthermore, an allowable minimum value of the reflectivity of the first reflection layer 196 at an incident angle between 40 and 60 degrees may be reduced from 80% to 50%. Hence, the reflectivity of the first reflection layer 196 at an incident angle between 40 and 60 degrees may decrease with the increasing incident angle.

The first reflection layer 196 may have a reflectivity of about less than 80% for the light entering at an incident angle of about more than 60 degrees. For example, an allowable maximum value of the reflectivity of the first reflection layer 196 may be less than 80% at an incident angle of more than 60 degrees, and an allowable minimum value of the reflectivity of the first reflection layer 196 may be less than 50% at an incident angle of more than 60 degrees. The reflectivity of the first reflection layer 196 at an incident angle of more than 60 degrees may decrease with the increasing incident angle.

As such, the first reflection layer 196 may reflect 80% or more of the light entering at an incident angle of 40 degrees or less. For the light entering at an incident angle of more than 40 degrees, the reflectivity of the first reflection layer 196 may decrease with the increasing incident angle. For example, the first reflection layer 196 may reflect 50% to 80% of light entering at an incident angle of about 60 degrees. For the light entering at an incident angle of more than 60 degrees, the reflectivity of the first reflection layer 196 may be 80% or lower.

Referring to FIG. 11, the first reflection layer 196 may have various reflectivity profiles P1, P2, P3 and P4.

For example, according to the first profile P1, the reflectivity of the first reflection layer 196 for the light entering at an incident angle of 40 degrees or less may be about 90% or higher. For the light entering at an incident angle of about 60 degrees, the reflectivity of the first reflection layer 196 may be about 80%. The reflectivity of the first reflection layer 196 for the light entering at an incident angle of more than 60 degrees may be less than 80%, and may decrease with the increasing incident angle.

According to the second profile P2, the reflectivity of the first reflection layer 196 for the light entering at an incident angle of 40 degrees or less may be about 90% or higher. For the light entering at an incident angle of about 60 degrees, the reflectivity of the first reflection layer 196 may be about 50%. The reflectivity of the first reflection layer 196 for the light entering at an incident angle of more than 60 degrees may be lower than 50%, and may decrease with the increasing incident angle.

According to the third profile P3, the reflectivity of the first reflection layer 196 for the light entering at an incident angle of 40 degrees or less may be about 80% or higher. For the light entering at an incident angle of about 60 degrees, the reflectivity of the first reflection layer 196 may be about 70%. The reflectivity of the first reflection layer 196 for the light entering at an incident angle of more than 60 degrees may be lower than 70%, and may decrease with the increasing incident angle.

According to the fourth profile P4, the reflectivity of the first reflection layer 196 for the light entering at an incident angle of 40 degrees or less may be about 80% or higher. For the light entering at an incident angle of about 60 degrees, the reflectivity of the first reflection layer 196 may be about 50%. The reflectivity of the first reflection layer 196 for the light entering at an incident angle of more than 60 degrees may be lower than 50%, and may decrease with the increasing incident angle.

As such, to have different reflectivity depending on the incident angle, the first reflection layer 196 may include a distributed Bragg reflector (DBR) formed by layering materials with different refractive indexes as shown in FIG. 12.

The DBR is able to reflect light of a particular wavelength entering at a particular incident angle by alternately layering a material having a first refractive index n1 and a material having a second refractive index n2. In this case, the first refractive index n1 may be different from the second refractive index n2. For example, the first refractive index n1 may be smaller than the second refractive index n2.

The DBR is able to reflect light by using constructive interference of light reflected from the border between the material having the first refractive index n1 and the material having the second refractive index n2.

Thickness Ta of the material having the first refractive index n1 and thickness Tb of the material having the second refractive index n2 may be set for the reflected light to be subjected to constructive interference. Specifically, when light enters vertically (at an incident angle of 0 degree), the thickness Ta of the material having the first refractive index n1 and thickness Tb of the material having the second refractive index n2 may be defined in Equation (1):

$$T_a = \lambda_1/4 = \lambda_0/4n_1.$$

$$T_b = \lambda_2/4 = \lambda_0/4n_2. \quad (1)$$

where Ta denotes thickness of the material having the first refractive index, λ1 denotes a wavelength of light in the material having the first refractive index, and n1 denotes the first refractive index. Tb denotes thickness of the material having the second refractive index, λ2 denotes a wavelength of light in the material having the second refractive index, and n2 denotes the second refractive index.

The first refractive layer 196 may include silicon dioxide ($SiO_2$) having a refractive index of 1.457 and titanium dioxide ($TiO_2$) having a refractive index of 2.493. The first reflection layer 196 is not, however, limited to including the $SiO_2$ and the $TiO_2$, and may include various materials having different refractive indexes.

Furthermore, the LED 190 may emit light of 420 nm to 480 nm from the emitting plane (the MQW layer 194). In the following description, it may be assumed that the LED 190 may emit light of about 400 nm.

To make the reflectivity of the first reflection layer 196 be 90% or higher for the light of 400 nm entering vertically, the thickness of the $SiO_2$ may be about 68 nm and the thickness of $TiO_2$ may be about 38.6 nm. In other words, the DBR with the $SiO_2$ of about 68 nm and the $TiO_2$ of about 38.6 nm, which are alternately layered multiple times (e.g., five or more times), may reflect 90% or more of the light of 400 nm entering vertically.

The light emitted from the emitting plane may enter the first reflection layer 196 not only vertically but also slantingly. The thickness Ta of the material having the first refractive index n1 and thickness Tb of the material having the second refractive index n2 may be set for the reflected light to be subjected to constructive interference. Specifically, assuming light incidence at an angle (at an incident angle of Θ degrees), the thickness Ta of the material having the first refractive index n1 and thickness Tb of the material having the second refractive index n2 may be defined in Equation (2):

$$T_a = \lambda_1/4 \cos\theta = \lambda_0/4n_1 \cos\theta$$

$$T_b = \lambda_2/4 \cos\theta = \lambda_0/4n_2 \cos\theta \quad (2)$$

where Θ denotes an incident angle of light, Ta denotes thickness of the material having the first refractive index, λ1 denotes a wavelength of light in the material having the first refractive index, and n1 denotes the first refractive index. Tb denotes thickness of the material having the second refractive index, λ2 denotes a wavelength of light in the material having the second refractive index, and n2 denotes the second refractive index.

The first refractive layer 196 may include $SiO_2$ having a refractive index of 1.457 and $TiO_2$ having a refractive index of 2.493. Furthermore, it may be assumed that the LED 190 may emit light of about 400 nm.

To make the reflectivity of the first reflection layer 196 be 90% or higher for the light of 400 nm entering at an incident angle of 40 degrees, the thickness of the $SiO_2$ may be about 88.4 nm and the thickness of $TiO_2$ may be about 50.2 nm. In other words, the DBR with the $SiO_2$ of about 88.4 nm and the $TiO_2$ of about 50.2 nm, which are alternately layered multiple times (e.g., five or more times), may reflect 90% or more of the light of 400 nm entering at the incident angle of 40 degrees.

As such, to reflect 80% or more of the light of 400 nm entering at an incident angle of 40 degrees or less, the first reflection layer 196 may include a first DBR layer 196*a* and a second DBR layer 196*b*. For example, the first DBR layer 196*a* may be formed by alternately layering the $SiO_2$ of about 68 nm and the $TiO_2$ of about 38.6 nm multiple times (e.g., five or more times). Furthermore, the second DBR layer 196*b* may be formed by alternately layering the $SiO_2$ of about 88.4 nm and the $TiO_2$ of about 50.2 nm multiple times (e.g., five or more times).

The first reflection layer 196 including the first DBR layer 196*a* and the second DBR layer 196*b* may have a reflectivity of about 80% or higher or about 90% or higher for the light entering at an incident angle of less than 40 degrees as in the first, second, third, or fourth profile P1, P2, P3 or P4.

Furthermore, the first reflection layer 196 may further include an n-th DBR layer 196*n* formed by alternately layering the $SiO_1$ having thickness Tan and the $TiO_2$ having thickness Tbn multiple times (e.g., five or more times).

As described above, the first reflection layer 196 including the $SiO_1$ having many different thicknesses and the $TiO_2$ having many different thicknesses may reflect 80% or more of light entering at an incident angle of 40 degrees or less. Furthermore, the first reflection layer 196 may reflect 50% to 80% of light entering at an incident angle of about 60 degrees, and the reflectivity of the first reflection layer 196 for light entering at an incident angle of more than 60 degrees may be lower than 80%.

Figure 13:
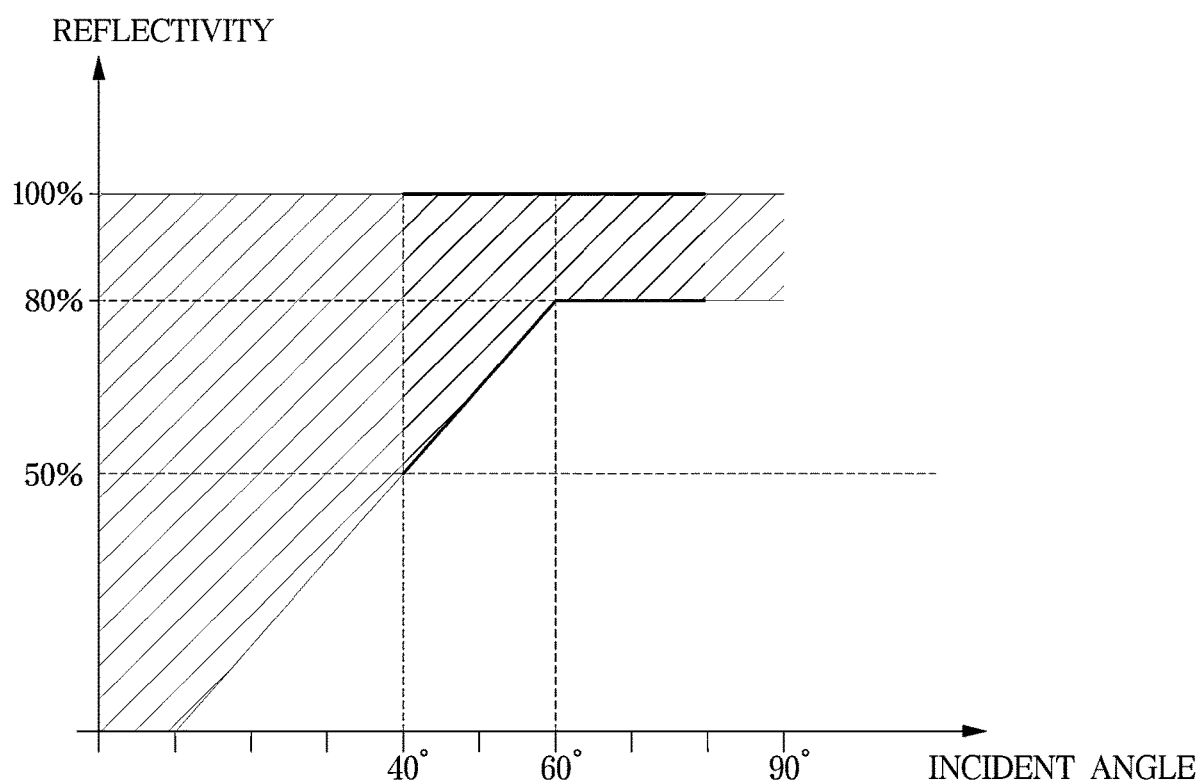
FIG. 13 is a diagram of reflectivity of a second reflection layer included in a light source device depending on incident angles, according to an embodiment.
Figure 14:
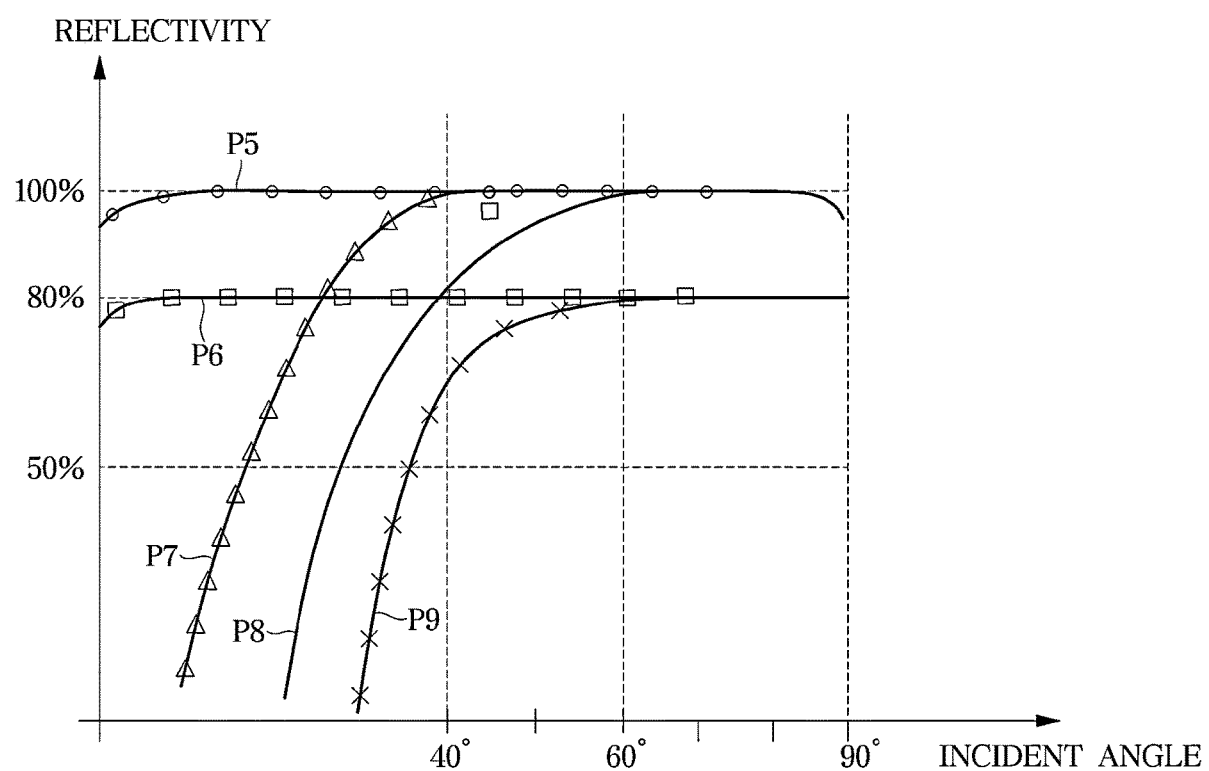
FIG. 14 is a diagram of reflectivity depending on incident angles as shown in FIG. 13, according to an embodiment.
Figure 15:
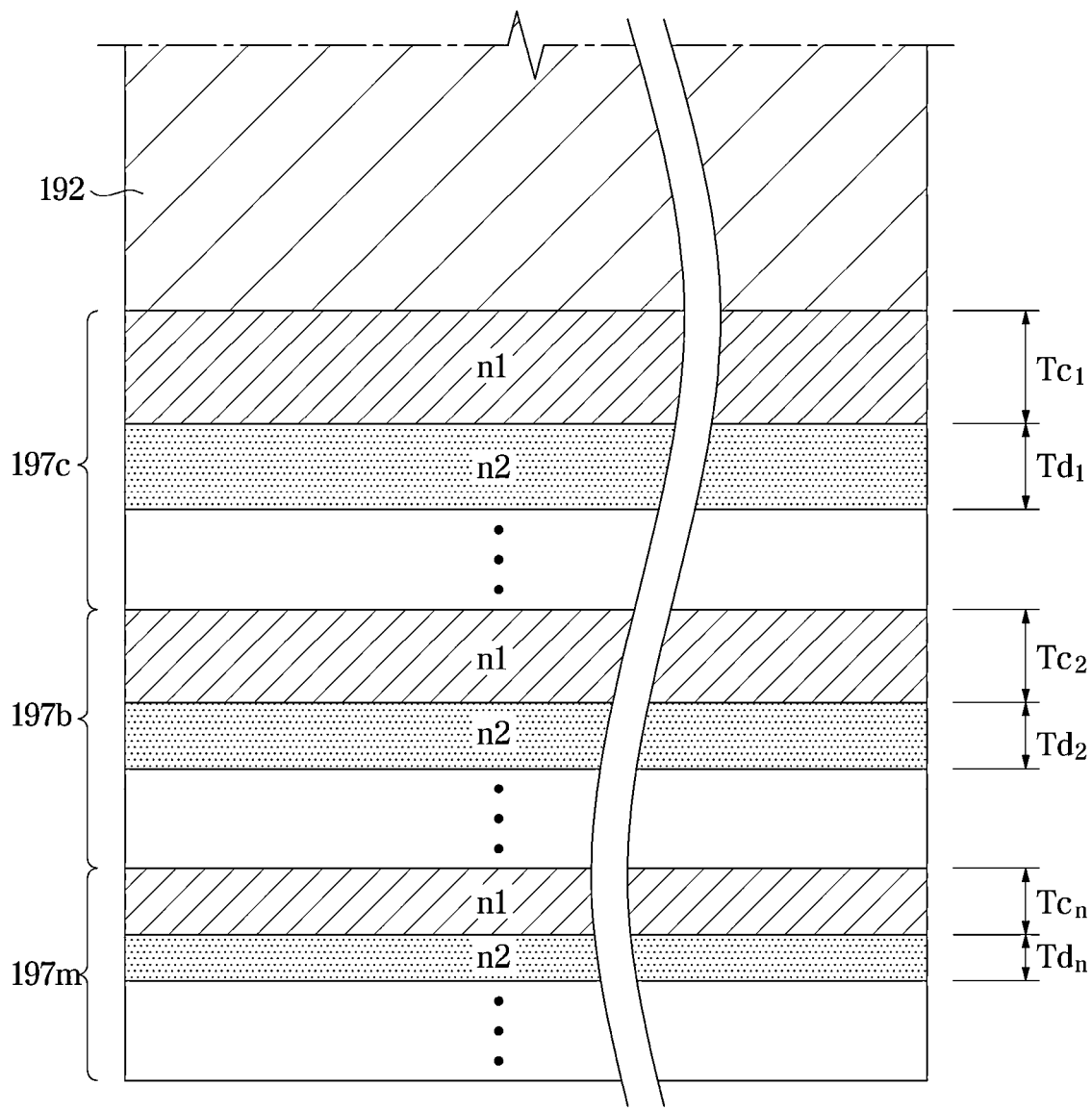
FIG. 15 is a diagram of a second reflection layer having reflectivity depending on incident angles as shown in FIG. 13, according to an embodiment.

FIG. 13 is a diagram of reflectivity of a second reflection layer included in a light source device depending on incident angles, according to an embodiment. FIG. 14 is a diagram of reflectivity depending on incident angles as shown in FIG. 13, according to an embodiment. FIG. 15 is a diagram of a second reflection layer having reflectivity depending on incident angles as shown in FIG. 13, according to an embodiment.

Referring to FIG. 13, reflectivity of the second reflection layer 197 included in the LED 190 may decrease with a decreasing incident angle or may be substantially constant regardless of the incident angle.

For example, the second reflection layer 197 may have a reflectivity of about 80% or higher for light entering at an incident angle of about 60 degrees or less. Most of light emitted obliquely at an incident angle of 60 degrees or more from the vertical direction of the emitting plane (e.g., the MQW layer 194) of the LED 190 may be reflected from the second reflection layer 197.

The second reflection layer 197 may have a reflectivity of about 50% or higher for the light entering at an incident angle of about 40 degrees. As such, an allowable maximum value of the reflectivity of the second reflection layer 197 at an incident angle between 40 and 60 degrees may still be maintained at 100%. On the other hand, an allowable minimum value of the reflectivity of the second reflection layer 197 at an incident angle between 40 and 60 degrees may be reduced from 80% to 50%. Hence, the reflectivity of the second reflection layer 197 at an incident angle between 40 and 60 degrees may decrease with a decreasing incident angle or may be substantially constant regardless of the incident angle.

An allowable minimum value of reflectivity of the second reflection layer 197 for the light entering at an incident angle of about less than 40 degrees may be less than 50%. The reflectivity of the second reflection layer 197 at an incident angle of less than 40 degrees may decrease with a decreasing incident angle or may be substantially constant regardless of the incident angle.

As such, the second reflection layer 197 may reflect 80% or more of the light entering at an incident angle of 60 degrees or more. The reflectivity of the first reflection layer 196 for light entering at an incident angle of less than 60 degrees may decrease with a decreasing incident angle or may be maintained at a substantially constant value regardless of the incident angle. For example, the second reflection layer 197 may reflect 50% or more of the light entering at an incident angle of about 40 degrees.

As shown in FIG. 14, the second reflection layer 197 may have various reflectivity profiles P5, P6, P7, P8, and P9.

For example, according to the fifth profile P5, the reflectivity of the second reflection layer 197 for a wide range of incident angles may be about 90% or higher. The second reflection layer 197 may reflect about 90% or more of the light entering at an incident angle of 0 degree, and may also reflect about 90% or more of the light entering at an incident angle of about 40 degrees and the light entering at an incident angle of about 60 degrees. The reflectivity of the second reflection layer 197 for a wide range of incident angles may be maintained at about 90% or higher. In this case, the second reflection layer 197 may be formed with various materials having high reflectivity, such as metal.

According to the sixth profile P6, the reflectivity of the second reflection layer 197 for a wide range of incident angles may be between about 80% and about 90%. In this case, the second reflection layer 197 may be formed with various materials having high reflectivity, such as metal.

According to the seventh profile P7, the reflectivity of the second reflection layer 197 for the light entering at an incident angle of 40 degrees or more may be about 90% or higher. The reflectivity of the second reflection layer 197 for the light entering at an incident angle of less than 40 degrees may decrease with a decreasing incident angle.

According to the eighth profile P8, the reflectivity of the second reflection layer 197 for the light entering at an incident angle of 60 degrees or more may be about 90% or higher. The reflectivity of the second reflection layer 197 for the light entering at an incident angle of less than 60 degrees may decrease with a decreasing incident angle. For example, the reflectivity of the second reflection layer 197 for the light entering at an incident angle of about 40 degrees, may be about 80%.

According to the ninth profile P9, the reflectivity of the second reflection layer 197 for the light entering at an incident angle of 60 degrees or more may be about 80% or higher. The reflectivity of the second reflection layer 197 for the light entering at an incident angle of less than 60 degrees may decrease with a decreasing incident angle. For example, the reflectivity of the second reflection layer 197 for the light entering at an incident angle of about 40 degrees, may be about 50%.

As such, to have different reflectivity depending on the incident angle, the second reflection layer 197 may include a DBR formed by layering materials with different refractive indexes as shown in FIG. 15.

The second reflection layer 197 may have a material having the first refractive index n1 and a material having the second refractive index n2 layered alternately.

Assuming light incidence at an angle (at an incident angle of 0 degrees), thickness Tc of the material having the first refractive index n1 and thickness Td of the material having the second refractive index n2 may be defined in Equation (3):

$$T_c = \lambda_1/4 \cos\theta = \lambda_0/4n_1 \cos\theta'$$

$$T_d = \lambda_2/4 \cos\theta = \lambda_0/4n_2 \cos\theta' \quad (3)$$

where Θ denotes an incident angle of light, Tc denotes thickness of the material having the first refractive index, λ1 denotes a wavelength of light in the material having the first refractive index, and n1 denotes the first refractive index. Td denotes thickness of the material having the second refractive index, λ2 denotes a wavelength of light in the material having the second refractive index, and n2 denotes the second refractive index.

The second refractive layer 197 may include $SiO_2$ having a refractive index of 1.457 and $TiO_2$ having a refractive index of 2.493. The second reflection layer 197 is not, however, limited to including the $SiO_2$ and the $TiO_2$, and may include various materials having different refractive indexes.

Although the LED 190 may emit light of 420 nm to 480 nm from the emitting plane (the MQW layer 194), it may be assumed for simpler computation in the following description that the LED 190 may emit light of about 400 nm.

To make the reflectivity of the second reflection layer 197 be 90% or higher for the light of 400 nm entering at an incident angle of 60 degrees, the thickness of the $SiO_2$ may be about 136 nm and the thickness of $TiO_2$ may be about 77.2 nm. In other words, the DBR with the $SiO_2$ of about 136 nm and the $TiO_2$ of about 77.2 nm, which are alternately layered multiple times (e.g., five or more times), may reflect 90% or more of the light of 400 nm entering at the incident angle of about 60 degrees.

To make the reflectivity of the second reflection layer 197 be 90% or higher for the light of 400 nm entering at an incident angle of 75 degrees, the thickness of the $SiO_2$ may be about 263 nm and the thickness of $TiO_2$ may be about 149 nm. In other words, the DBR with the $SiO_2$ of about 263 nm and the $TiO_2$ of about 149 nm, which are alternately layered multiple times (e.g., five or more times), may reflect 90% or more of the light of 400 nm entering at the incident angle of about 75 degrees.

As described above, the DBR with the $SiO_2$ of about 88.4 nm and the $TiO_2$ of about 50.2 nm, which are alternately layered multiple times (e.g., five or more times), may reflect 90% or more of the light of 400 nm entering at the incident angle of about 40 degrees. Furthermore, the DBR with the $SiO_2$ of about 68 nm and the $TiO_2$ of about 38.6 nm, which are alternately layered multiple times (e.g., five or more times), may reflect 90% or more of the light of 400 nm entering vertically.

As such, to reflect 80% or more of the light of 400 nm entering at an incident angle of 60 degrees or more, the second reflection layer 197 may include a third DBR layer 197c and a fourth DBR layer 197d. For example, the third DBR layer 197c may be formed by alternately layering the $SiO_2$ of about 263 nm and the $TiO_2$ of about 149 nm multiple times (e.g., five or more times). Furthermore, the fourth DBR layer 197d may be formed by alternately layering the $SiO_4$ of about 136 nm and the $TiO_2$ of about 77.2 nm multiple times (e.g., five or more times).

The second reflection layer 197 including the third DBR layer 197c and the fourth DBR layer 197d may have a reflectivity of about 80% or higher or about 90% or higher for the light entering at an incident angle of 60 degrees or more as in the eighth or ninth profile P8 or P9.

Furthermore, to reflect 80% or more of the light of 400 nm entering at an incident angle of 40 degrees or more, the second reflection layer 197 may further include a fifth DBR layer. The fifth DBR layer may be formed by alternately layering the $SiO_5$ of about 88.4 nm and the $TiO_2$ of about 50.2 nm multiple times (e.g., five or more times).

The second reflection layer 197 including the third DBR layer 197c, the fourth DBR layer 197d, and the fifth DBR layer may have a reflectivity of about 80% or higher or about 90% or higher for the light entering at an incident angle of 40 degrees or more as in the seventh profile P7.

Furthermore, to reflect 80% or more of the light of 400 nm entering in a wide range of incident angles, the second reflection layer 197 may further include a sixth DBR layer. The sixth DBR layer may be formed by alternately layering the $SiO_6$ of about 68 nm and the $TiO_2$ of about 38.6 nm multiple times (e.g., five or more times).

The second reflection layer 197 including the third DBR layer 197c, the fourth DBR layer 197d, the fifth DBR layer, and the sixth DBR layer may have a reflectivity of about 80% or higher or about 90% or higher for the light entering in a wide range of incident angles as in the fifth or sixth profile P5 or P6.

Furthermore, the second reflection layer 197 may further include an m-th DBR layer 197m formed by alternately layering the $SiO_2$ having thickness Tcm and the $TiO_2$ having thickness Tdm multiple times (e.g., five or more times).

As described above, the second reflection layer 197 including the $SiO_2$ in many different thicknesses and the $TiO_2$ in many different thicknesses may reflect 80% or more of light entering at an incident angle of 60 degrees or more. Moreover, the reflectivity of the second reflection layer 197 at an incident angle of less than 60 degrees may decrease with a decreasing incident angle or may be maintained at a constant value regardless of reduction in the incident angle.

In summary, a display apparatus according to an embodiment of the disclosure may include a liquid crystal panel, a substrate, and a plurality of LEDs provided on one side of the substrate for emitting light towards the liquid crystal panel. Each of the plurality of LEDs may include a first reflection layer, a second reflection layer, and a light emitting layer arranged between the first reflection layer and the second reflection layer. The second reflection layer may be arranged between the substrate and the light emitting layer, and a reflectivity of the first reflection layer for first light entering at a first incident angle may be different from a reflectivity of the second reflection layer for the first light entering at the first incident angle.

The reflectivity of the first reflection layer for the first light entering at the first incident angle may be greater than a reflectivity of the first reflection layer for second light entering at a second incident angle greater than the first incident angle.

For example, when the first incident angle is equal to or less than a first reference angle, the reflectivity of the first reflection layer for first light may be 80% or higher. When the first incident angle exceeds the first reference angle, the reflectivity of the first reflection layer for the first light entering at the first incident angle may be greater than the reflectivity of the first reflection layer for the second light entering at the second incident angle greater than the first incident angle. The first reference angle may be 40 degrees or less.

For example, when the first incident angle is 60 degrees, which is greater than the first reference angle, the reflectivity of the first reflection layer for the first light may be in between 50% and 80%.

The reflectivity of the second reflection layer for the first light entering at the first incident angle may be equal to or greater than a reflectivity of the second reflection layer for third light entering at a third incident angle less than the first incident angle.

For example, when the first incident angle is equal to or greater than a second reference angle, the reflectivity of the second reflection layer for the first light may be 80% or higher. When the first incident angle is less than the second reference angle, the reflectivity of the second reflection layer for the first light entering at the first incident angle may be equal to or greater than the reflectivity of the second reflection layer for the third light entering at the third incident angle less than the first incident angle. The second reference angle may be 60 degrees or more.

For example, when the first incident angle is 40 degrees, which is less than the second reference angle, the reflectivity of the second reflection layer for the first light may be 50% or higher.

For example, the reflectivity of the first reflection layer for the first light entering at the first incident angle of 40 degrees or less may be greater than the reflectivity of the second reflection layer for the first light.

For example, the reflectivity of the first reflection layer for the first light entering at the first incident angle of 60 degrees or more may be less than the reflectivity of the second reflection layer for the first light.

For example, each of the first reflection layer and the second reflection layer may include a DBR.

Intensity of light emitted from the LED in a direction perpendicular to the first reflection layer may be less than intensity of light emitted from the LED in a direction not perpendicular to the first reflection layer.

For example, light emitted from the LED may have the highest intensity in a slanted direction at an angle between 40 and 60 degrees from the perpendicular direction to the first reflection layer.

The display apparatus may further include a plurality of optical domes covering the plurality of LEDs separately. Each of the plurality of optical domes may have a diameter of about 10 mm or less and a height of about 5 mm or less.

In an embodiment of the disclosure, the display apparatus may include a liquid crystal panel, a substrate, and a plurality of LEDs provided on one side of the substrate for emitting light towards the liquid crystal panel. Each of the plurality of LEDs may include a first reflection layer, a second reflection layer, and a light emitting layer arranged between the first reflection layer and the second reflection layer. The second reflection layer may be arranged between the substrate and the light emitting layer. A reflectivity of the first reflection layer for first light entering at a first incident angle may be greater than a reflectivity of the first reflection layer for second light entering at a second incident angle greater than the first incident angle. A reflectivity of the second reflection layer for the first light entering at the first incident angle may be equal to or less than the reflectivity of the second reflection layer for the second light entering at the second incident angle.

For example, when the first incident angle is equal to or less than a first reference angle, the reflectivity of the first reflection layer for the first light may be 80% or higher. When the first incident angle exceeds the first reference angle, the reflectivity of the first reflection layer for the first light entering at the first incident angle may be greater than the reflectivity of the first reflection layer for the second light entering at the second incident angle greater than the first incident angle.

For example, when the first incident angle is equal to or greater than a second reference angle, the reflectivity of the second reflection layer for the first light may be 80% or higher. When the first incident angle is less than the second reference angle, the reflectivity of the second reflection layer for the first light entering at the first incident angle may be equal to or greater than a reflectivity of the second reflection layer for third light entering at a third incident angle less than the first incident angle.

In an embodiment of the disclosure, the display apparatus 1 may include a liquid crystal panel, a substrate, and a plurality of LEDs provided on one side of the substrate for emitting light towards the liquid crystal panel. Each of the plurality of LEDs may include a first reflection layer, a second reflection layer, and a light emitting layer arranged between the first reflection layer and the second reflection layer. A reflectivity of the first reflection layer for first light entering at a first incident angle may be greater than a reflectivity of the second reflection layer for the first light. A reflectivity of the first reflection layer for the first light entering at a second incident angle greater than the first incident angle may be less than the reflectivity of the second reflection layer for the first light.

For example, the reflectivity of the first reflection layer for the first light entering at the first incident angle of 40 degrees or less may be greater than the reflectivity of the second reflection layer for the first light. A reflectivity of the first reflection layer for second light entering at the second incident angle, which is equal to or greater than 60 degrees, may be less than a reflectivity of the second reflection layer for the second light.

According to embodiments of the disclosure, a display apparatus is capable of maintaining uniformity in brightness and minimizing the number of light sources while reducing the optical distance.

The disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

The machine-readable storage medium may be provided in the form of a non-transitory storage medium. Here, when a storage medium is referred to as "non-transitory," it may be understood that the storage medium is tangible and does not include a signal, but rather that data is semi-permanently or temporarily stored in the storage medium.

According to one embodiment, the methods according to the various embodiments disclosed herein may be provided in a computer program product. The computer program product may be traded between a seller and a buyer as a product. The computer program product may be distributed in the form of a machine-readable storage medium (e.g., compact disc read only memory (CD-ROM)), or may be distributed through an application store (e.g., Play Store™) online. In the case of online distribution, at least a portion of the computer program product may be stored at least semi-permanently or may be temporarily generated in a storage medium, such as a memory of a server of a manufacturer, a server of an application store, or a relay server.

Although embodiments of the present disclosure have been described with reference to the accompanying drawings, those skilled in the art will appreciate that these inventive concepts may be embodied in different forms without departing from the scope and spirit of the disclosure, and should not be construed as limited to the embodiments set forth herein.

What is claimed is:

1. A display apparatus, comprising:
a liquid crystal panel;
a substrate; and
a plurality of light emitting diodes (LEDs) provided on one side of the substrate and configured to emit light towards the liquid crystal panel,
wherein each LED of the plurality of LEDs comprises:
a first reflection layer;
a second reflection layer; and
a light emitting layer provided between the first reflection layer and the second reflection layer,
wherein the second reflection layer is provided between the substrate and the light emitting layer,
wherein a first reflectivity of the first reflection layer for a first light entering at a first incident angle is different from a second reflectivity of the second reflection layer for the first light entering at the first incident angle, and
wherein a fourth reflectivity of the second reflection layer for light entering at an angle other than the first incident angle is different from the second reflectivity of the second reflection layer.

2. The display apparatus of claim 1, wherein the first reflectivity of the first reflection layer for the first light entering at the first incident angle is greater than a third reflectivity of the first reflection layer for a second light entering at a second incident angle larger than the first incident angle.

3. The display apparatus of claim 1, wherein at the first incident angle being equal to or less than a first reference angle, the first reflectivity of the first reflection layer for the first light is equal to or greater than about 80%, and
wherein at the first incident angle exceeding the first reference angle, the first reflectivity of the first reflection layer for the first light entering at the first incident angle is greater than a third reflectivity of the first reflection layer for a second light entering at a second incident angle greater than the first incident angle.

4. The display apparatus of claim 3, wherein the first reference angle is less than or equal to about 40 degrees.

5. The display apparatus of claim 3, wherein at the first incident angle being about 60 degrees and being greater than the first reference angle, the first reflectivity of the first reflection layer for the first light is between about 50% and about 80%.

6. The display apparatus of claim 1, wherein the second reflectivity of the second reflection layer for the first light entering at the first incident angle is equal to or greater than the fourth reflectivity of the second reflection layer for third light entering at a third incident angle that is less than the first incident angle.

7. The display apparatus of claim 1, wherein at the first incident angle being equal to or greater than a second reference angle, the second reflectivity of the second reflection layer for the first light is greater than or equal to about 80%, and
wherein at the first incident angle being less than the second reference angle, the second reflectivity of the second reflection layer for the first light entering at the first incident angle is equal to or greater than the fourth reflectivity of the second reflection layer for third light entering at a third incident angle less than the first incident angle.

8. The display apparatus of claim 7, wherein the second reference angle is greater than or equal to about 60 degrees.

9. The display apparatus of claim 7, wherein at the first incident angle being about 40 degrees and the first incident angle being less the second reference angle, the second reflectivity of the second reflection layer for the first light is greater than or equal to about 50%.

10. The display apparatus of claim 1, wherein the first reflectivity of the first reflection layer for the first light entering at the first incident angle is greater than the second reflectivity of the second reflection layer for the first light when the first incident angle is less than or equal to about 40 degrees.

11. The display apparatus of claim 1, wherein the first reflectivity of the first reflection layer for the first light entering at the first incident angle is less than the second reflectivity of the second reflection layer for the first light when the first incident angle is greater than or equal to about 60 degrees.

12. The display apparatus of claim 1, wherein each of the first reflection layer and the second reflection layer comprises a distributed Bragg reflector (DBR).

13. The display apparatus of claim 1, wherein a first intensity of light emitted from each LED of the plurality of LEDs in a direction perpendicular to the first reflection layer is less than a second intensity of light emitted from each LED of the plurality of LEDs in a direction not perpendicular to the first reflection layer.

14. The display apparatus of claim 1, wherein the light emitted from each LED of the plurality of LEDs has a highest intensity in a slanted direction at an angle between about 40 degrees and about 60 degrees from a perpendicular direction to the first reflection layer.

15. The display apparatus of claim 1, further comprising a plurality of optical domes respectively covering the plurality of LEDs separately, wherein each optical dome of the plurality of optical domes has a diameter of about 10 mm or less and a height of about 5 mm or less.

16. A display apparatus comprising:
a liquid crystal panel;
a substrate; and
a plurality of light emitting diodes (LEDs) provided on the substrate and configured to emit light;
wherein each LED of the plurality of LEDs comprises:
a first reflection layer;
a second reflection layer; and
a light emitting layer provided between the first reflection layer and the second reflection layer,
wherein the second reflection layer is provided between the substrate and the light emitting layer, and
wherein a first reflectivity of the first reflection layer for a first light entering at a first incident angle is greater than a second reflectivity of the first reflection layer for a second light entering at a second incident angle being greater than the first incident angle, and
a third reflectivity of the second reflection layer for the first light entering at the first incident angle is equal to or less than a fourth reflectivity of the second reflection layer for the second light entering at the second incident angle.

17. The display apparatus of claim 16, wherein when the first incident angle being equal to or less than a first reference angle, the first reflectivity of the first reflection layer for the first light is equal to or greater than about 80%, and
wherein at the first incident angle exceeding the first reference angle, the first reflectivity of the first reflection layer for the first light entering at the first incident angle is greater than the second reflectivity of the first reflection layer for the second light entering at the second incident angle greater than the first incident angle.

18. The display apparatus of claim 17, wherein the first reference angle is less than or equal to about 40 degrees.

19. The display apparatus of claim 16, at the first incident angle being equal to or greater than a second reference angle, the second reflectivity of the second reflection layer for the first light is greater than or equal to about 80%, and wherein at the first incident angle being less than the second reference angle, the third reflectivity of the second reflection layer for the first light entering at the first incident angle is greater than or equal to a fifth reflectivity of the second reflection layer for third light entering at a third incident angle less than the first incident angle.

20. The display apparatus of claim 19, wherein the second reference angle is greater than or equal to about 60 degrees.

\* \* \* \* \*